(12) United States Patent
Kawamata et al.

(10) Patent No.: US 11,889,042 B2
(45) Date of Patent: Jan. 30, 2024

(54) INFORMATION PROCESSING APPARATUS, INFORMATION PROCESSING SYSTEM, FEE MANAGEMENT METHOD, AND RECORDING MEDIUM THAT TRANSMITS USAGE FEE IN RESPONSE TO DETECTING THAT FIRST AND SECOND USERS BELONG TO A SAME GROUP

(71) Applicants: Yuji Kawamata, Tokyo (JP); Nekka Matsuura, Kanagawa (JP)

(72) Inventors: Yuji Kawamata, Tokyo (JP); Nekka Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/184,170

(22) Filed: Mar. 15, 2023

(65) Prior Publication Data
US 2023/0308586 A1 Sep. 28, 2023

(30) Foreign Application Priority Data
Mar. 22, 2022 (JP) .................................. 2022-045721

(51) Int. Cl.
*G06Q 20/20* (2012.01)
*G06V 20/52* (2022.01)
*H04N 1/34* (2006.01)

(52) U.S. Cl.
CPC ........... *H04N 1/344* (2013.01); *G06Q 20/202* (2013.01); *G06V 20/52* (2022.01)

(58) Field of Classification Search
CPC ....... H04N 1/344; G06Q 20/202; G06V 20/52
See application file for complete search history.

(56) References Cited

U.S. PATENT DOCUMENTS 10,373,322 B1 8/2019 Buibas et al.
2006/0065715 A1* 3/2006 Kojima ................ G06Q 20/352
235/380

(Continued)

FOREIGN PATENT DOCUMENTS

JP 2001-242754 9/2001
JP 2013-041497 2/2013

(Continued)

OTHER PUBLICATIONS

English Machine Translation of JP 2004-171068-A (Aoi et al., Published Jun. 17, 2004) (Year: 2004).*

(Continued)

*Primary Examiner* — Juan M Guillermety
(74) *Attorney, Agent, or Firm* — IPUSA, PLLC

(57) ABSTRACT

An information processing apparatus includes a first image receiver configured to receive a first image captured by an imaging apparatus in which a user of an electronic device and the electronic device are captured; a first user identifier configured to identify a first user from the first image; a usage information receiver configured to receive, from the electronic device, usage information based on an operation of the first user identified by the first user identifier; a second image receiver configured to receive a second image captured by the imaging apparatus in which a settlement apparatus and a second user capable of using the settlement apparatus are captured; a second user identifier configured to identify the second user from the second image; and a usage information transmitter configured to transmit the usage information to the settlement apparatus, based on the identified first user and the identified second user.

7 Claims, 21 Drawing Sheets

(56) References Cited

U.S. PATENT DOCUMENTS

2015/0350480 A1* 12/2015 Nakahashi .......... G06Q 20/145
                                                      705/40
2022/0215396 A1    7/2022 Ueki et al.

FOREIGN PATENT DOCUMENTS

| | | |
|---|---|---|
| JP | 2016-181101 | 10/2016 |
| JP | 2020-053019 | 4/2020 |
| JP | 2020-166638 | 10/2020 |

OTHER PUBLICATIONS

English Machine Translation of JP 2019-174943-A (Yamada, Published Oct. 10, 2019) (Year: 2019).*
English Machine Translation of JP 4507055 B2 (Maki et al., Published Sep. 16, 2004) (Year: 2004).*

* cited by examiner

FIG.6A

| REGISTERED OBJECT ID | GROUP ID | EXISTENCE CONFIRMATION FLAG | ATTRIBUTE INFORMATION | DEVICE OPERATION INFORMATION |
|---|---|---|---|---|
| U001 | G001 | 1 | (x1.y1.z1) | ... |
| U002 | G001 | 1 | (x2.y2.z2) | ... |
| U003 | 0 | 1 | (x3.y3.z3) | ... |
| ... | ... | ... | ... | ... |

FIG.6B

| REGISTERED DEVICE ID | ATTRIBUTE INFORMATION | DEVICE INPUT INFORMATION | DEVICE OUTPUT INFORMATION |
|---|---|---|---|
| D001 | (x4.y4.z4) | ... | ... |
| D002 | (x5.y5.z5) | ... | ... |
| ... | ... | ... | ... |

FIG.6C

| DETECTED OBJECT ID | GROUP ID | ATTRIBUTE INFORMATION |
|---|---|---|
| T001 | 0 | (x6.y6.z6) |
| T002 | G002 | (x7.y7.z7) |
| ... | ... | ... |

FIG.21

| | OUTPUT CONDITION | OPERATION INSTRUCTION |
|---|---|---|
| 1 | DEVICE OPERATION INFORMATION EXISTS, IN WHICH mTH REGISTERED OBJECT (PERSON $\alpha$) HAS PERFORMED OPERATION THAT INCURS FEE AT ELECTRONIC DEVICE (MFP), AND THERE IS NO PAYMENT COMPLETED FLAG | 1. ADD MFP USAGE FEE TO BILLING AMOUNT TO PERSON $\alpha$ AND PRESENT AMOUNT AFTER ADDITION<br>2. INSTRUCT MANAGEMENT APPARATUS TO ADD PAYMENT COMPLETED FLAG TO DEVICE OPERATION INFORMATION OF PERSON $\alpha$ |
| 2 | DEVICE OPERATION INFORMATION EXISTS, IN WHICH kTH REGISTERED OBJECT (PERSON $\beta$) HAS PERFORMED OPERATION THAT INCURS FEE AT ELECTRONIC DEVICE (MFP), AND THERE IS NO PAYMENT COMPLETED FLAG<br>* kTH REGISTERED OBJECT (PERSON $\beta$) HAS SAME GROUP ID AS mTH REGISTERED OBJECT (PERSON $\alpha$) | 1. ADD MFP USAGE FEE OF PERSON $\beta$ TO BILLING AMOUNT TO PERSON $\alpha$ AND PRESENT AMOUNT AFTER ADDITION<br>2. PRESENT OPTION OF "PERSON $\beta$ WILL PAY, NOT PERSON $\alpha$", AND IF YES, MFP USAGE FEE OF PERSON $\beta$ IS SUBTRACTED FROM BILLING AMOUNT PRESENTED TO PERSON $\alpha$, AND PRESENT AMOUNT AFTER SUBTRACTION<br>3. INSTRUCT MANAGEMENT APPARATUS TO ADD PAYMENT COMPLETED FLAG TO DEVICE OPERATION INFORMATION OF PERSON $\beta$, WHEN PERSON $\alpha$ HAS PAID THE BILLING AMOUNT TO WHICH MFP USAGE FEE OF PERSON $\beta$ HAS BEEN ADDED |

INFORMATION PROCESSING APPARATUS, INFORMATION PROCESSING SYSTEM, FEE MANAGEMENT METHOD, AND RECORDING MEDIUM THAT TRANSMITS USAGE FEE IN RESPONSE TO DETECTING THAT FIRST AND SECOND USERS BELONG TO A SAME GROUP

CROSS-REFERENCE TO RELATED APPLICATION

The present application is based on and claims priority under 35 U.S.C. § 119 to Japanese Patent Application No. 2022-045721, filed on Mar. 22, 2022, the contents of which are incorporated herein by reference in their entirety.

BACKGROUND OF THE INVENTION

1. Field of the Invention

The present invention relates to an information processing apparatus, an information processing system, a fee management method, and a recording medium.

2. Description of the Related Art

For example, there is a technology to implement an unmanned store in a retail store such as a convenience store or a supermarket by tracking a user by using a video of a camera installed in the store. For example, Patent Document 1 discloses an unmanned store system in which the user is identified by facial recognition at the time of entry, payment, and exit, and the price of the article is calculated by object recognition at the time of payment.

On the other hand, electronic devices such as digital multifunction peripherals or multimedia terminals, for example, are sometimes installed in retail stores. The operation of these electronic devices usually incurs usage fees, and, therefore, a means for settling usage fees is provided. For example, Patent Document 2 discloses an image forming apparatus by which usage fees can be settled by a point-of-sales (POS) terminal in a store.

Patent Document 1: Japanese Unexamined Patent Application Publication No. 2020-166638
Patent Document 2: Japanese Unexamined Patent Application Publication No. 2001-242754

SUMMARY OF THE INVENTION

According to one aspect of the present invention, there is provided an information processing apparatus including a first image receiver configured to receive a first image captured by an imaging apparatus in which a user of an electronic device and the electronic device are captured, the imaging apparatus and the electronic device being communicable with the information processing apparatus via a network; a first user identifier configured to identify a first user from the first image; a usage information receiver configured to receive, from the electronic device, usage information based on an operation of the first user identified by the first user identifier; a second image receiver configured to receive a second image captured by the imaging apparatus in which a settlement apparatus and a second user capable of using the settlement apparatus are captured, the settlement apparatus being communicable with the information processing apparatus via the network; a second user identifier configured to identify the second user from the second image; and a usage information transmitter configured to transmit the usage information to the settlement apparatus, based on the first user identified by the first user identifier and the second user identified by the second user identifier.

BRIEF DESCRIPTION OF THE DRAWINGS

FIGS. 6A to 6C illustrate an example of state management information in one embodiment of the present invention;

FIG. 21 illustrates an example of device output information in one embodiment of the present invention.

DESCRIPTION OF THE EMBODIMENTS

Figure 1:
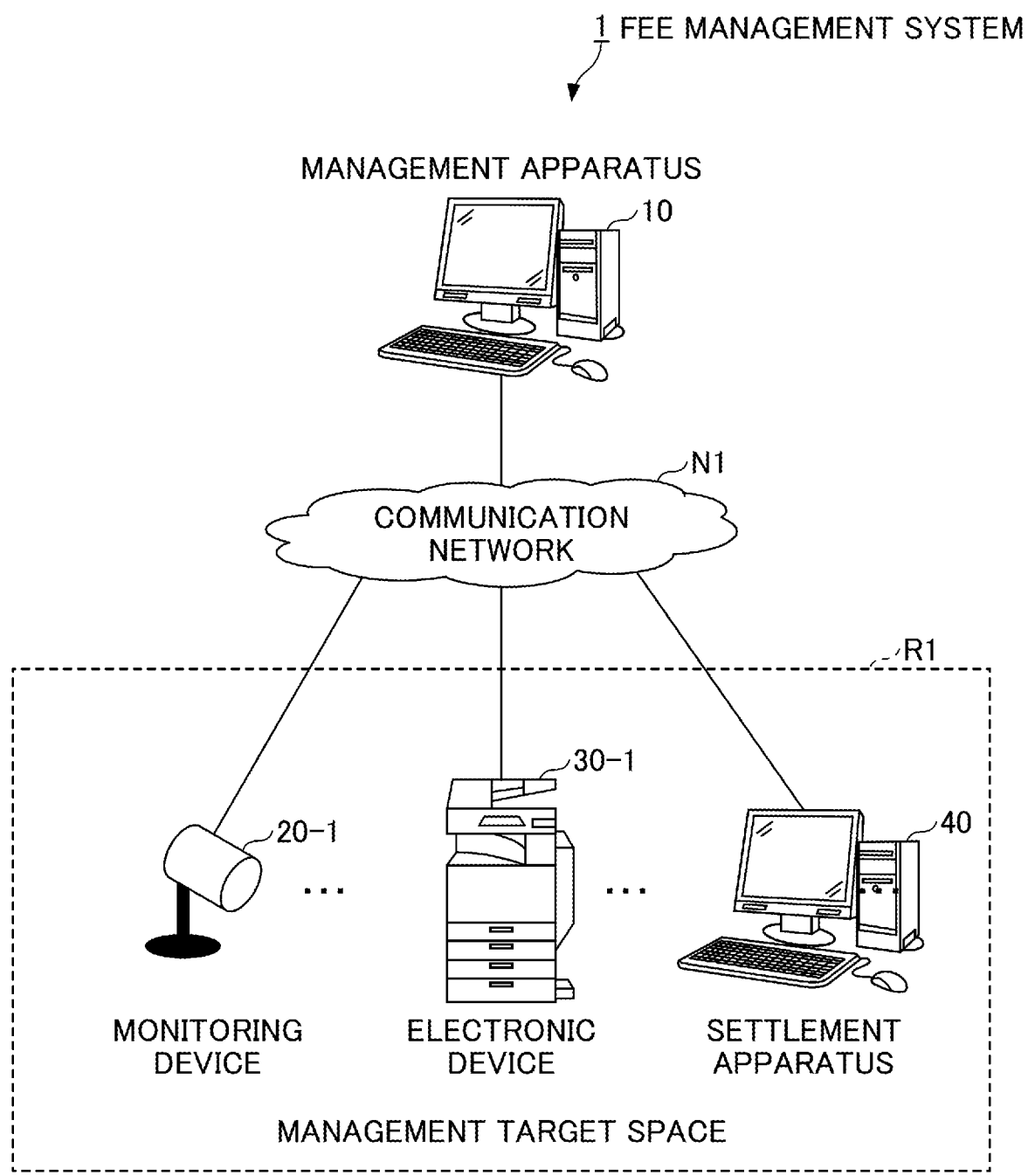
FIG. 1 illustrates an example of the overall configuration of a fee management system in one embodiment of the present invention.

In the conventional technology, it is difficult to settle fees, including the usage fee incurred by the user's operation of an electronic device in a retail store. For example, although the technology disclosed in Patent Document 1 calculates the price of an article by object recognition, it is difficult to calculate a usage fee by recognizing complex operations on an electronic device from a video, etc. Further, for example, in a store visited by unidentified users, it is difficult to determine whether the user who has operated the electronic device and the user who is making the settlement are the same person.

A problem to be addressed by an embodiment of the present invention is to transmit usage information based on an operation by a user with respect to an electronic device, to a settlement apparatus in the vicinity of the user who has operated the electronic device.

Hereafter, an embodiment of the present invention will be described in detail with reference to the drawings. In the drawings, elements having the same function will be denoted by the same reference numerals, and duplicate descriptions will be omitted.

EMBODIMENT

An embodiment of the present invention relates to a fee management system that settles fees including a usage fee based on the operation of an electronic device installed in a store. In the fee management system in the present embodiment, when a person who operates an electronic device is in the vicinity of the settlement apparatus, the usage fee based on the operation performed by the person with respect to the electronic device is presented by the settlement apparatus.

For example, in the unmanned store system disclosed in Patent Document 1, the price is calculated by object recognition of an image capturing an article on a checkout counter. However, because complex operations are performed at an electronic device installed in the store, it is difficult to calculate the usage fee for using the electronic device by image recognition. For example, when a copy operation is performed in a digital multifunction peripheral, the usage fee varies depending on the mode such as monochrome or color. There are cases where the previous setting is carried over in these operations, and, therefore, it is not possible to calculate the usage fee unless details of the entire operation of the user is recognized, which is unrealistic.

The electronic device recognizes the usage fee, and if the electronic device has a communication function, the electronic device can transmit the fee information representing the usage fee to the settlement apparatus. However, the settlement apparatus is unable to determine whether the user who has performed the operation with respect to the electronic device and the user who is making the settlement are the same person. In the invention disclosed in Patent Document 1, a user is identified by facial recognition from when the user enters the store until the user leaves the store, but prior registration of the user is required. In a store visited by unidentified users, it is difficult to determine whether the user who has performed the operation with respect to the electronic device and the user in the vicinity of a settlement apparatus are the same person.

In the fee management system in the present embodiment, the management apparatus tracks a user moving in a space where the electronic device and the settlement apparatus are installed based on images in which the space is captured. Thus, the management apparatus can determine whether the user who has performed the operation with respect to the electronic device and the user in the vicinity of a settlement apparatus are the same person.

If the users can be determined to be the same person, the usage fee based on the operation with respect to the electronic device can be presented by the settlement apparatus in the vicinity of the corresponding user. If the usage fee incurred at the electronic device can be settled by the settlement apparatus, there is no need to provide a settlement means for each electronic device and capital investment can be reduced. Further, the user does not need to settle the usage fee every time the user operates the electronic device, which is highly convenient.

<Overall Configuration of Fee Management System>

First, the overall configuration of the fee management system in the present embodiment will be described with reference to FIG. 1. FIG. 1 is a diagram illustrating an example of the overall configuration of the fee management system in the present embodiment.

As illustrated in FIG. 1, a fee management system 1 in the present embodiment includes a management apparatus 10, one or more monitoring devices 20, one or more electronic devices 30, and a settlement apparatus 40. The management apparatus 10, the monitoring device 20, the electronic device 30, and the settlement apparatus 40 are connected to the communication network N1, respectively.

The communication network N1 is configured such that the connected devices can communicate with each other. The communication network N1 is constructed by a network using wired communication such as the Internet, a Local Area Network (LAN), or a Wide Area Network (WAN), for example.

The communication network N1 may include not only a wired communication network but also a wireless communication network such as wireless LAN or short-range wireless communication; or a mobile communication network such as Worldwide Interoperability for Microwave Access (WiMAX), Long Term Evolution (LTE), or 5th Generation (5G).

The monitoring device 20, the electronic device 30, and the settlement apparatus 40 are installed in a management target space R1. The management target space R1 can be a single space such as a room in a building or multiple spaces connected by a door or accessible spaces such as a hallway.

An example of the management target space R1 is a sales floor or the like in a small store such as a convenience store. Another example of the management target space R1 is a lobby or a guest room in a hotel or the like. The management target space R1 is not limited to these and can be any space where an electronic device, in which usage fees may arise by being operated, is installed.

The management apparatus 10 is an information processing apparatus such as a personal computer (PC), a workstation, or a server that manages the electronic device 30 and the settlement apparatus 40. The management apparatus 10 transmits an operation instruction to the settlement apparatus 40 based on an image received from the monitoring device 20 and fee information received from the electronic device 30. One example of the management apparatus 10 is a computer.

The monitoring device 20 is an electronic device that acquires an image including the vicinity of the electronic device 30 and the settlement apparatus 40 installed in the management target space R1. The monitoring device 20 may acquire a video (namely, time-series image). The monitoring device 20 is installed at a position where all of the multiple electronic devices 30 and the settlement apparatus 40 can be captured.

One example of the monitoring device 20 is a celestial sphere imaging apparatus. Another example of the monitoring device 20 is a plurality of network cameras. When the monitoring device 20 is a plurality of network cameras, each network camera is arranged with the angle of view adjusted such that there is no blind spot in the management target space R1.

In the following, when there are a plurality of the monitoring devices 20 and when distinguishing each of the multiple monitoring devices 20 from each other, branch numbers such as "monitoring device 20-1", the "monitoring device 20-2", etc., are used.

The electronic device 30 may be various types of electronic devices used by users. An example of the electronic device 30 is an image forming apparatus (a printer, a fax machine, an MFP (multifunction peripheral/product/printer: digital MFP), a scanner device, etc.). Another example of the electronic device 30 is a multimedia terminal, a coffee machine, and an article recognition device, etc.

The article recognition device in the present embodiment is installed on or near an article shelf. The article recognition device recognizes an article removed from or returned to the article shelf by a user, for example, by a weight sensor, an infrared sensor, an image sensor, or the like. Further, the article recognition device outputs fee information relating to the article removed from the article shelf.

In the following, when distinguishing each of the multiple electronic devices 30 from each other, branch numbers such as "electronic device 30-1" and "electronic devices 30-2" are used.

The settlement apparatus 40 is an information processing apparatus that settles the price of an article purchased and/or the fee relating to a service used by a user of a store. The settlement apparatus 40 presents the billing amount charged to the user on a display or the like, and performs settlement processing with the money received from the user. In the settlement apparatus 40, a barcode scanner, a settlement terminal, a cash receiver or the like are externally connected as needed. One example of the settlement apparatus 40 is a computer. Another example of the settlement apparatus 40 is a cash register.

Note that the electronic device 30 is not limited to an image forming apparatus as long as the device has a communication function. That is, the electronic device 30 may be, for example, a projector (PJ), an output device such as digital signage, a Head Up Display (HUD) device, an industrial machine, an imaging apparatus, a sound collector, a medical device, a network home appliance, an automobile (connected car), a notebook personal computer (PC), a mobile phone, a smartphone, a tablet terminal, a game machine, a personal digital assistant (PDA), a digital camera, a wearable PC, a desktop PC, or the like.

<Hardware Configuration of the Fee Management System>

Next, the hardware configuration of each device included in the fee management system in the present embodiment will be described with reference to FIGS. 2 to 4.

<<Computer Hardware Configuration>>

Figure 2:
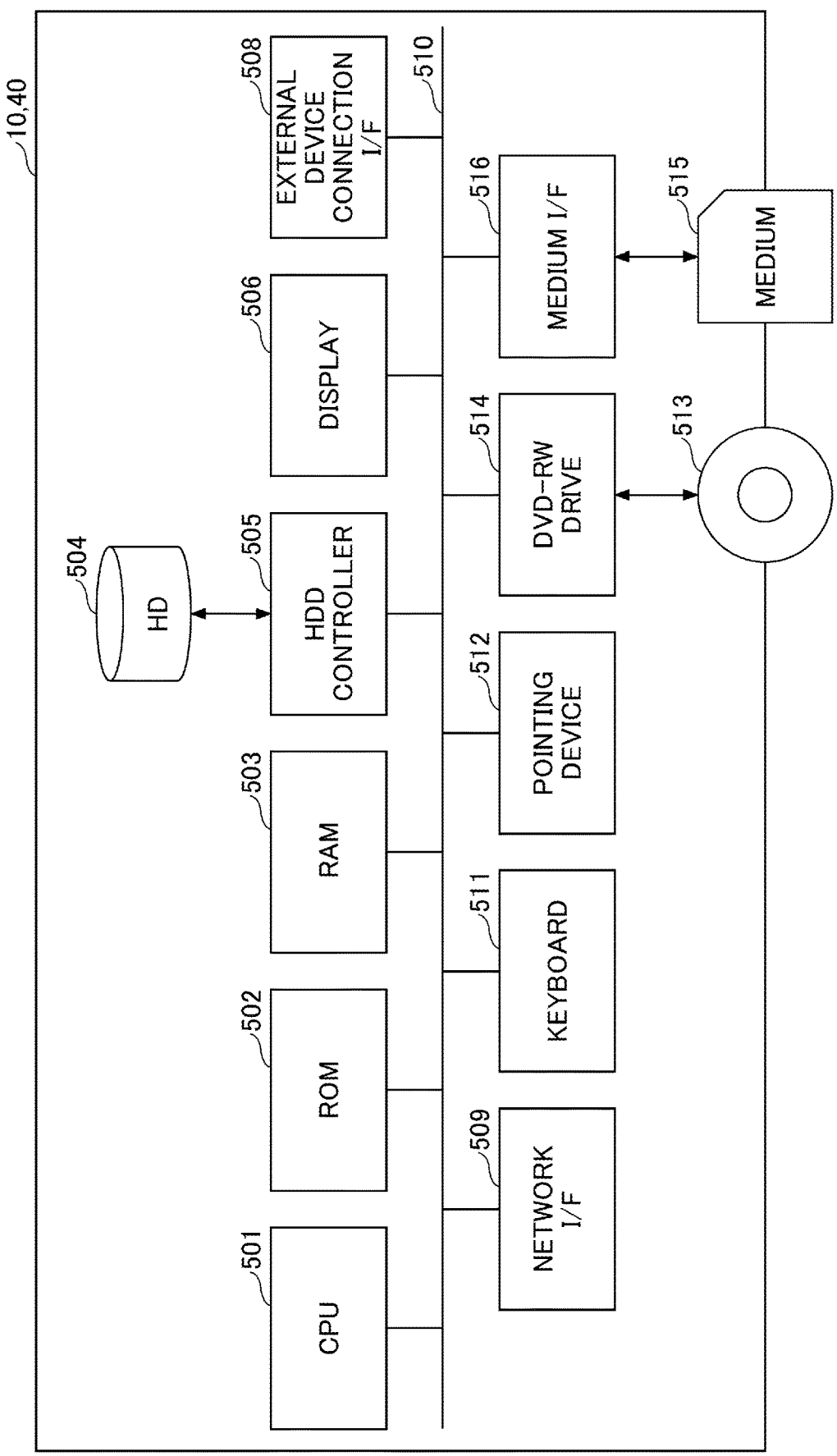
FIG. 2 illustrates an example of the hardware configuration of a computer in one embodiment of the present invention.

FIG. 2 illustrates an example of the hardware configuration when the management apparatus 10 and the settlement apparatus 40 are implemented by a computer.

As illustrated in FIG. 2, the computer in one embodiment includes a Central Processing Unit (CPU) 501, a Read Only Memory (ROM) 502, a Random Access Memory (RAM) 503, a Hard Disk (HD) 504, a Hard Disk Drive (HDD) controller 505, a display 506, an external device connection interface (I/F) 508, a network I/F 509, a bus line 510, a keyboard 511, a pointing device 512, a Digital Versatile Disc Rewritable (DVD-RW) drive 514, and a medium I/F 516.

Among these, the CPU 501 controls the operation of the entire computer. The ROM 502 stores programs used to drive the CPU 501, such as Initial Program Loader (IPL). The RAM 503 is used as a work area for the CPU 501. The HD 504 stores various kinds of data such as programs. The HDD controller 505 controls the reading or writing of various kinds of data from and to the HD 504 according to the control of the CPU 501.

The display 506 displays various kinds of information such as cursors, menus, windows, characters, or images. The external device connection I/F 508 is an interface for connecting various external devices. The external devices in this case are, for example, Universal Serial Bus (USB) memories, printers, etc. The network I/F 509 is an interface for data communication by using the communication network N1. The bus line 510 is an address bus, a data bus, or the like for electrically connecting each element such as the CPU 501 illustrated in FIG. 2.

The keyboard 511 is a kind of input means equipped with multiple keys for input of characters, numbers, various instructions, and the like. The pointing device 512 is a kind of input means for selecting and executing various instructions, selecting a processing object, moving a cursor, and the like. The DVD-RW drive 514 controls the reading or writing of various kinds of data from and to a DVD-RW 513 as an example of a detachable recording medium. The recording medium is not limited to the DVD-RW, and a Digital Versatile Disc Recordable (DVD-R) or the like may be used. The medium I/F 516 controls the reading or writing (storage) of data to a recording medium 515 such as a flash memory.

<<Hardware Configuration of Celestial Sphere Imaging Apparatus>>

Figure 3:
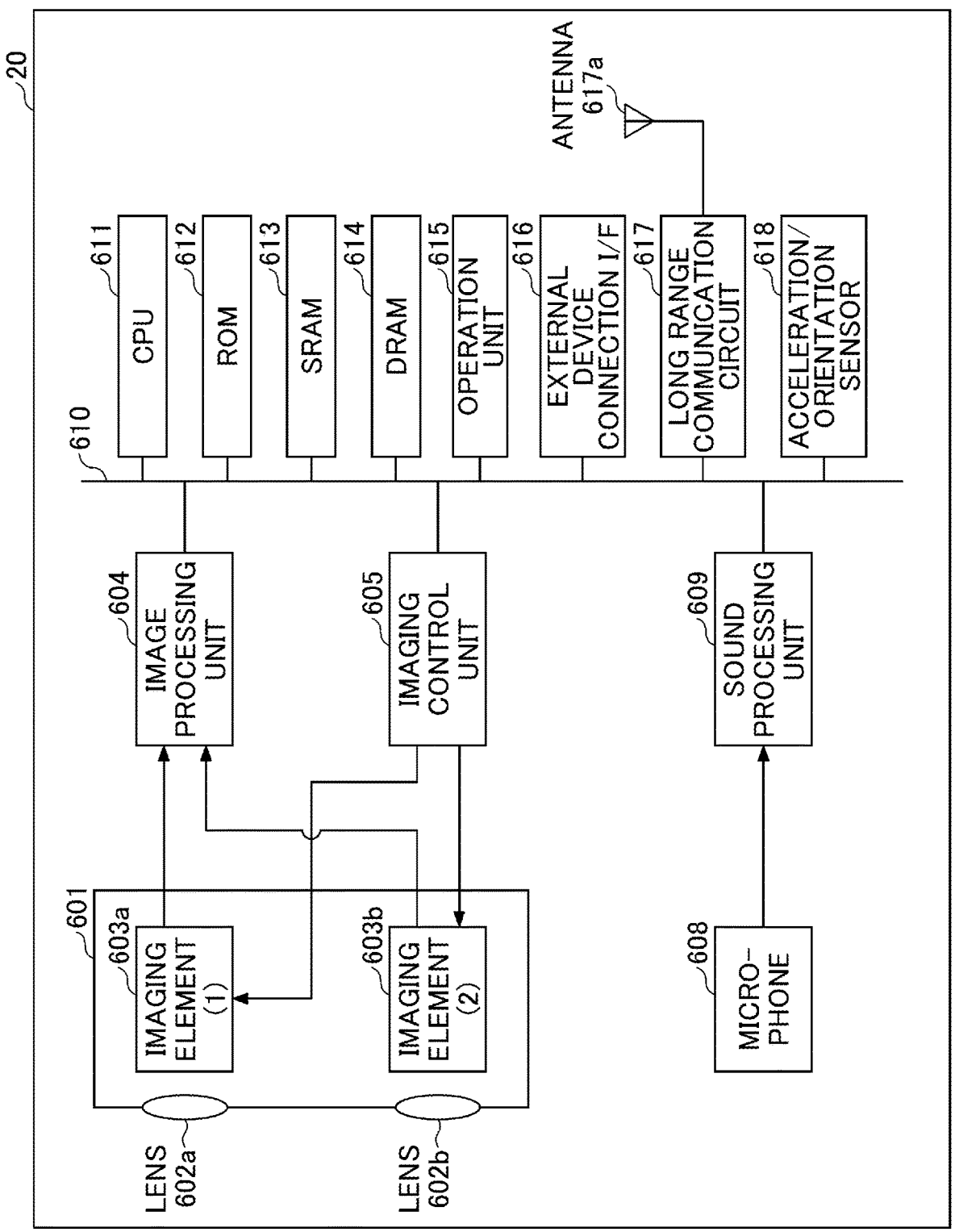
FIG. 3 illustrates an example of the hardware configuration of a celestial sphere imaging apparatus in one embodiment of the present invention.

FIG. 3 is a diagram illustrating an example of the hardware configuration in a case where the monitoring device 20 is implemented by a celestial sphere imaging apparatus. In the following, the celestial sphere imaging apparatus is a celestial sphere (omnidirectional) imaging apparatus using two imaging elements, but any number of imaging elements may be used as long as there are two or more imaging elements. Furthermore, the monitoring device 20 need not be a device exclusively used for omnidirectional imaging, but a retrofitting omnidirectional imaging unit may be attached to a typical digital camera, smartphone, etc., so that the monitoring device has substantially the same function as a celestial sphere imaging apparatus.

As illustrated in FIG. 3, the celestial sphere imaging apparatus in one embodiment includes an imaging unit 601, an image processing unit 604, an imaging control unit 605, a microphone 608, a sound processing unit 609, a central processing unit (CPU) 611, a read only memory (ROM) 612, a static random access memory (SRAM) 613, a dynamic random access memory (DRAM) 614, an operation unit 615, an external device connection I/F 616, a long range communication circuit 617, an antenna 617a, and an acceleration/orientation sensor 618.

Among these, the imaging unit 601 is equipped with wide-angle lenses (what are referred to as fisheye lenses) 602a and 602b each having an angle of view of 180 degrees or more for imaging a hemispherical image, and two imaging elements 603a and 603b provided so as to correspond to the respective wide-angle lenses. The imaging elements 603a and 603b are equipped with image sensors such as a Complementary Metal Oxide Semiconductor (CMOS) sensor and a Charge Coupled Device (CCD) sensor which convert the optical image produced by the fisheye lenses 602a and 602b into the image data of an electric signal and output the image data, a timing generation circuit which generates a horizontal or vertical synchronization signal of the image sensor, the pixel clock, etc., and a group of registers in which various commands and parameters necessary for the operation of the imaging element are set.

The imaging elements 603a and 603b of the imaging unit 601 are each connected to the image processing unit 604 by a parallel I/F bus. On the other hand, the imaging elements 603a and 603b of the imaging unit 601 are connected to the imaging control unit 605 by a serial I/F bus (such as an I2C bus). The image processing unit 604, the imaging control unit 605, and the sound processing unit 609 are connected to the CPU 611 via a bus 610. Also connected to the bus 610 are the ROM 612, the SRAM 613, the DRAM 614, the operation unit 615, the external device connection I/F 616, the long range communication circuit 617, the acceleration/orientation sensor 618, and the like.

The image processing unit 604 takes in the image data output from the imaging elements 603a and 603b through the parallel I/F bus, applies predetermined processing to each piece of image data, and then performs synthesis processing on the pieces of image data to create data of an equidistant cylindrical projection image.

Generally, the imaging control unit 605 sets commands and the like in the group of registers of the imaging elements 603a and 603b by using the I2C bus with the imaging control unit 605 as the master device and the imaging elements 603a and 603b as the slave device. Necessary commands and the like are received from the CPU 611. Further, by using the I2C bus, the imaging control unit 605 takes in the status data and the like of the group of registers of the imaging elements 603a and 603b and sends the status data to the CPU 611.

Further, the imaging control unit 605 instructs the imaging elements 603a and 603b to output image data at the timing when the shutter button of the operation unit 615 is pressed. Some celestial sphere imaging apparatuses have a preview display function or a function to support video display by means of a display (for example, a smartphone display). In this case, the output of image data from the imaging elements 603a and 603b is continuously performed at a predetermined frame rate (frames per minute).

Further, as described later, the imaging control unit 605 functions as a synchronous control means for synchronizing the output timing of image data of the imaging elements 603a and 603b in cooperation with the CPU 611. Note that, in the present embodiment, the celestial sphere imaging apparatus is not provided with a display, but a display unit may be provided.

The microphone 608 converts sound into sound (signal) data. A sound processing unit 609 takes in sound data output from the microphone 608 through an I/F bus and applies predetermined processing to the sound data.

The CPU 611 controls the overall operation of the celestial sphere imaging apparatus and performs necessary processing. The ROM 612 stores various programs for the CPU 611. The SRAM 613 and the DRAM 614 are work memories and store programs executed by the CPU 611, data being processed, etc. In particular, the DRAM 614 stores image data being processed by the image processing unit 604 and data of the processed equidistant cylindrical projection image.

The operation unit 615 is a generic name for operation buttons such as a shutter button 615a. The user inputs various image capturing modes, image capturing conditions, etc., by operating the operation unit 615.

The external device connection I/F 616 is an interface for connecting various external devices. The external device in this case is, for example, a Universal Serial Bus (USB) memory or a Personal Computer (PC). Data of the equidistant cylindrical projection image stored in the DRAM 614 is recorded on a medium externally attached via the external device connection I/F 616, or transmitted to an external terminal (device) such as a smartphone via the external device connection I/F 616 as needed.

The long range communication circuit 617 communicates with an external terminal (device) such as a smartphone via Wi-Fi, Near Field Communication (NFC), Bluetooth (registered trademark), or other short-range wireless communication technologies via the antenna 617a provided in the celestial sphere imaging apparatus. The long range communication circuit 617 can also transmit data of the equidistant cylindrical projection image to an external terminal (device) such as a smartphone.

The acceleration/orientation sensor 618 calculates the orientation of the celestial sphere imaging apparatus from the earth's magnetism and outputs orientation information. This orientation information is an example of related information (metadata) in line with Exif and is used for image processing such as image correction of the captured image. The related information also includes data on the date and time of image capturing and the data volume of the image data. The acceleration/orientation sensor 618 is a sensor that detects the change in angle (roll angle, pitch angle, and yaw angle) associated with the movement of the celestial sphere imaging apparatus. The change in angle is an example of related information (metadata) in line with Exif, and is used for image processing such as image correction of the captured image.

Furthermore, the acceleration/orientation sensor 618 is a sensor for detecting acceleration in three axes directions. The celestial sphere imaging apparatus calculates the posture (angle to the direction of gravity) thereof (the celestial sphere imaging apparatus) based on the acceleration detected by the acceleration/orientation sensor 618. The accuracy of image correction is improved by providing the acceleration/orientation sensor 618 in the celestial sphere imaging apparatus.

<<Hardware Configuration of MFP>>

Figure 4:
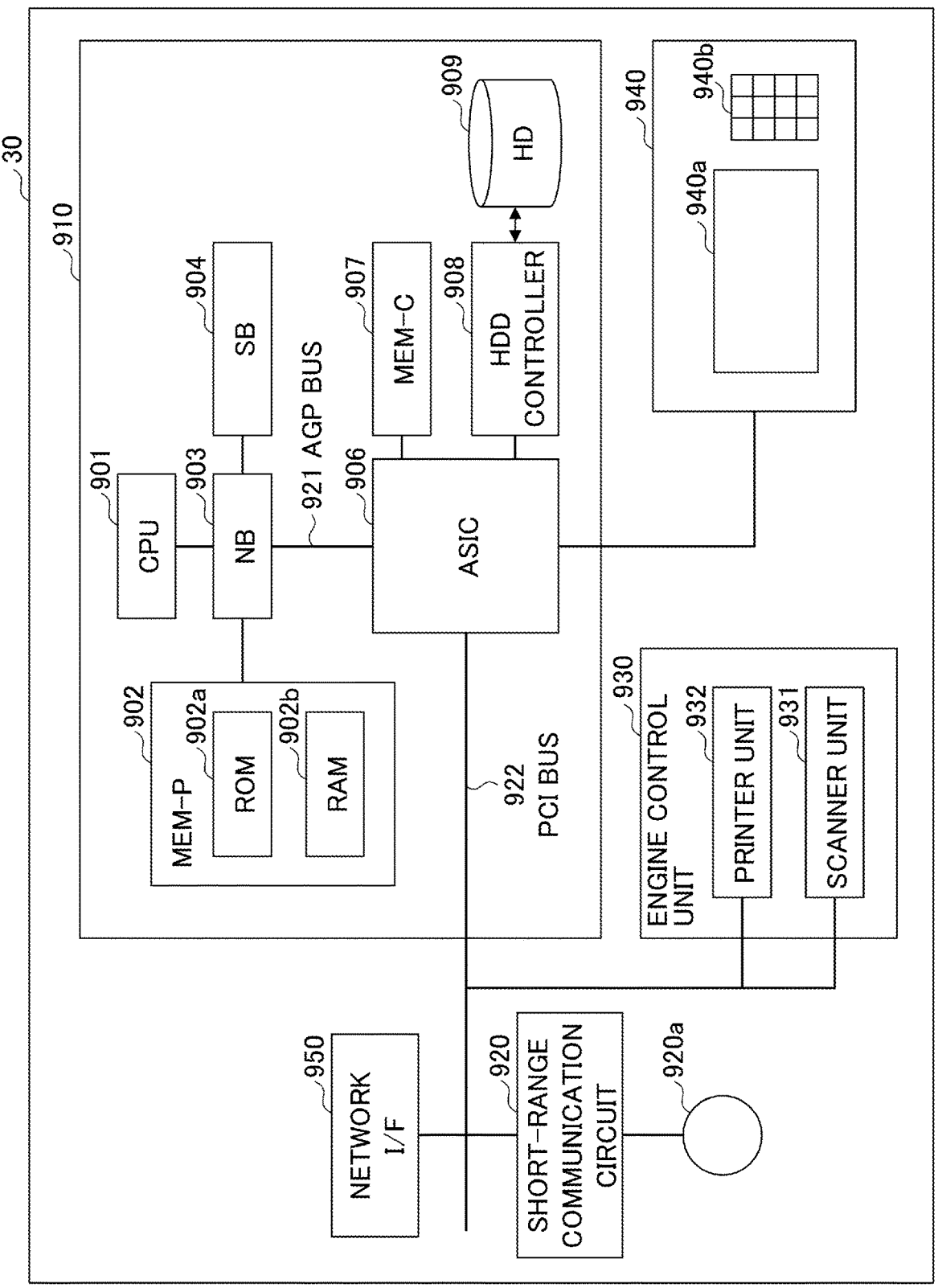
FIG. 4 illustrates an example of the hardware configuration of a multifunction peripheral in one embodiment of the present invention.

FIG. 4 illustrates an example of the hardware configuration in a case where the electronic device 30 is implemented by an MFP.

As illustrated in FIG. 4, the MFP in one embodiment includes a controller 910, a short-range communication circuit 920, an engine control unit 930, an operation panel 940, and a network I/F 950.

Among these, the controller 910 includes a CPU 901, a system memory (MEM-P) 902, a north bridge (NB) 903, a south bridge (SB) 904, an Application Specific Integrated Circuit (ASIC) 906, a local memory (MEM-C) 907, a HDD controller 908, and a HD 909 that is a storage unit, which are the main parts of the computer, and the NB 903 and the ASIC 906 are connected by an Accelerated Graphics Port (AGP) bus 921.

Among these, the CPU 901 is a control unit that performs overall control of the MFP. The NB 903 is a bridge for connecting the CPU 901 with the MEM-P 902, the SB 904, and the AGP bus 921, and has a memory controller that controls reading and writing from and to the MEM-P 902, a Peripheral Component Interconnect (PCI) master, and an AGP target.

The MEM-P 902 includes a ROM (Read Only Memory) 902a, which is a memory for storing programs and data that implement the functions of the controller 910, and a RAM (Random Access Memory) 902b, which is used as a memory for expanding programs and data and for rendering during memory printing. Note that the programs stored in the RAM 902b may be configured to be provided in a file of an installable or executable format by recording the programs on a computer-readable recording medium such as a compact disc read-only memory (CD-ROM), a CD recordable (CD-R), or a Digital Versatile Disc (DVD).

The SB 904 is a bridge for connecting the NB 903 to PCI devices and peripherals. The ASIC 906 is an integrated circuit (IC) for image processing applications with hardware elements for image processing, and serves as a bridge connecting the AGP bus 921, a PCI bus 922, the HDD controller 908, and the MEM-C 907 to each other. The ASIC 906 includes a PCI target and an AGP master, an arbiter (ARB) that forms the core of the ASIC 906, a memory controller that controls the MEM-C 907, multiple Direct Memory Access Controllers (DMACs) that rotate image data by hardware logic, etc., and a PCI unit that transfers data between a scanner unit 931 and a printer unit 932 via the PCI bus 922. A USB (Universal Serial Bus) interface or an IEEE 1394 (Institute of Electrical and Electronics Engineers 1394) interface may be connected to the ASIC 906.

The MEM-C 907 is a local memory used as a copy image buffer and a code buffer. The HD 909 is a storage for storing image data, storing font data used in printing, and storing forms. The HD 909 controls the reading or writing of data from and to the HD 909 according to the control of the CPU 901. The AGP bus 921 is a bus interface for a proposed graphics accelerator card to speed up graphics processing, and can speed up the graphics accelerator card by directly accessing the MEM-P 902 at high throughput.

Further, the short-range communication circuit 920 is equipped with an antenna 920a. The short-range communication circuit 920 is a communication circuit such as NFC, Bluetooth, etc.

Furthermore, the engine control unit 930 includes of the scanner unit 931 and the printer unit 932. Furthermore, the operation panel 940 is equipped with a panel display unit 940a such as a touch panel for displaying current setting values, selection screens, etc., and receiving input from an operator, and an operation panel 940b configured by a numeric keypad for receiving setting values of conditions relating to image formation such as density setting conditions and a start key for receiving copy start instructions. The controller 910 controls the entire MFP and controls rendering, communication, input from the operation panel 940, etc., for example. The scanner unit 931 or the printer unit 932 includes an image processing unit for performing processing such as error diffusion and gamma conversion.

Functions of the MFP can be selected by sequentially switching among a document box function, a copy function, a printer function, and a facsimile function by an application switching key on the operation panel 940. The MFP is set to the document box mode when the document box function is selected, to the copy mode when the copy function is selected, to the printer mode when the printer function is selected, and to the facsimile mode when the facsimile mode is selected.

The network I/F 950 is an interface for data communication by using the communication network N1. The short-range communication circuit 920 and the network I/F 950 are electrically connected to the ASIC 906 via the PCI bus 922.

<Functional Configuration of the Fee Management System>

Figure 5:
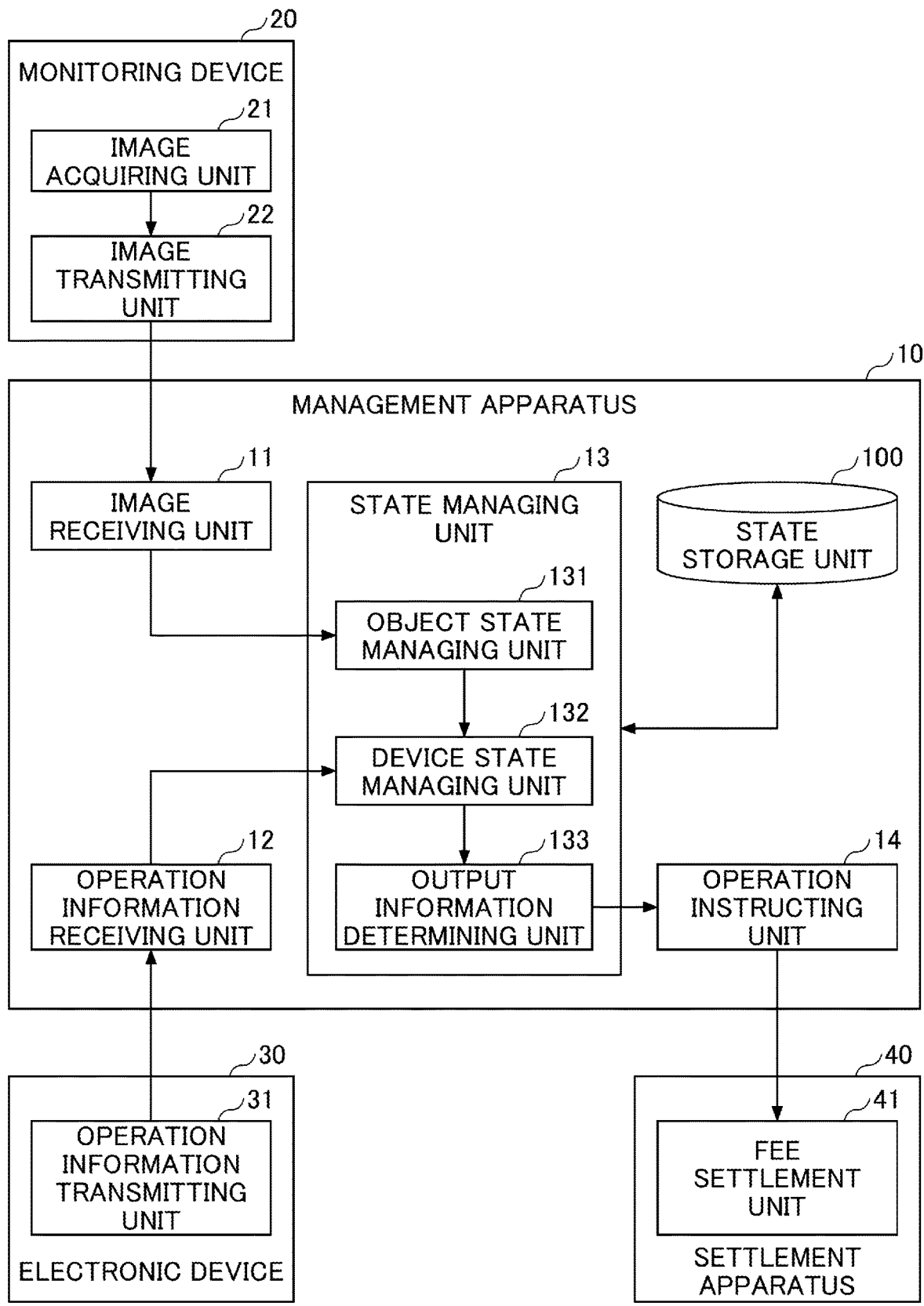
FIG. 5 illustrates an example of the functional configuration of a fee management system in one embodiment of the present invention.

Next, an example of the functional configuration of the fee management system in the present embodiment will be described with reference to FIG. 5. FIG. 5 is a block diagram illustrating an example of the functional configuration of each device included in the fee management system in the present embodiment.

<<Functional Configuration of Management Apparatus>>

As illustrated in FIG. 5, the management apparatus 10 in the present embodiment includes an image receiving unit 11, an operation information receiving unit 12, a state managing unit 13, an operation instructing unit 14, and a state storage unit 100. The state managing unit 13 in the present embodiment includes an object state managing unit 131, a device state managing unit 132, and an output information determining unit 133.

The image receiving unit 11, the operation information receiving unit 12, the state managing unit 13, and the operation instructing unit 14 are implemented, for example, by a process in which a program loaded into the RAM 503 from the HD 504 illustrated in FIG. 2 is executed by the CPU 501 and the HDD controller 505.

The state storage unit 100 is implemented, for example, by using the HD 504 illustrated in FIG. 2. Reading or writing data from or to the HD 504 is performed, for example, via the HDD controller 505.

The state storage unit 100 stores state management information for managing the state of the device and objects existing in the management target space R1. The state management information in the present embodiment includes a registered object list, a registered device list, and a detected object list.

The registered object list is a list that manages information relating to objects existing in the management target space R1. The object in the present embodiment is a person.

The registered device list is a list that manages information relating to the devices existing in the management target space R1. The devices in the present embodiment are the electronic device 30 and the settlement apparatus 40.

The detected object list is a list for managing the objects detected in the management target space R1. The detected object list is a temporary list used to update the registered object list.

The state management information in the present embodiment will be described with reference to FIGS. 6A to 6C. FIG. 6A is a conceptual diagram illustrating an example of the registered object list.

As illustrated in FIG. 6A, the registered object list in the present embodiment includes a registered object ID, a group ID, an existence confirmation flag, attribute information, device operation information, and billing information as data items.

The registered object ID is identification information identifying an object included in the registered object list.

The group ID is identification information identifying a group to which multiple registered objects belong. The group ID is given when it is determined that some of the registered objects included in the registered object list belong to the same group. An initial value (e.g. zero) is set for the group ID of a registered object that is not determined to belong to a group.

Each group includes, for example, co-workers, parents and children, or friends. Members belonging to a group jointly carry out jobs such as shopping. Therefore, it is expected that by recognizing a group, the action of a person can be identified more accurately. For example, when parents and children are shopping together, it is more convenient for parents to be able to collectively pay for the usage fee of the MFP that the child has used to perform copying.

The existence confirmation flag is a flag indicating whether the registered object exists in the management target space R1. For example, the existence confirmation flag is set to 1 if the registered object exists in the management target space R1, and is set to 0 if the registered object does not exist in the management target space R1.

The attribute information is information that accompanies the registered object and is necessary for management. In the present embodiment, the attribute information is the position of the registered object and the time when the position has been confirmed (hereafter also referred to as "image acquisition time"). The position of the registered object is expressed by three-dimensional coordinates (that is, values on each axis in a orthogonal coordinate system, such as the X, Y, and Z axes).

The method of acquiring position information varies depending on the type of the monitoring device 20. For example, if the monitoring device 20 is a network camera, publicly known techniques such as acquiring the distance to an object by a stereo camera and mapping the distance to three-dimensional coordinates along with the direction can be used.

In addition to the position of the registered object, the attribute information may include various kinds of information indicating the characteristics of the registered object. For example, the color or shape of the registered object may be used. If the object is a person, it is preferable to use color because the shape varies with the posture. The number of color types or the area of each color also varies according to the posture, and, therefore, when determining whether the object is identical or not, it is preferable to make it a condition whether at least one color is continuous.

The device operation information is information about a device operation performed by the registered object. The device operation information may include usage information that represents the content of usage of the electronic device. For example, if the electronic device is an MFP, the usage information is information such as 5 color copies and 10 monochrome copies have been executed. The device operation information may include fee information representing the fee incurred in the device operation. The device operation information includes, for example, a function executed by the user on the electronic device, the operation time, the usage information representing the content of the operation, the fee information of the fee in exchange for the operation, the language used, etc.

When the device operation information includes fee information, a payment completed flag is added to each piece of fee information. The payment completed flag is a true/false value indicating whether the fee information indicates that the fee has been paid. The payment completed flag has an initial value of 0 (=false) indicating not paid.

The number of objects existing in management target space R1 changes from time to time. Therefore, the number of registered objects included in the list of registered objects is variable.

FIG. 6B is a conceptual diagram illustrating an example of the registered device list. As illustrated in FIG. 6B, the registered device list in the present embodiment includes a registered device ID, attribute information, device input information, and device output information as data items.

The registered device ID is identification information identifying devices included in the registered device list.

Attribute information is information that accompanies a registered device and is necessary for management. In the present embodiment, the attribute information includes information such as the position of the registered device, the power on/off status, whether the device is in sleep mode, whether authentication is required, the option installment status, state information expressing during maintenance/scheduled maintenance time/during energy saving mode, etc. The position of the registered device is expressed by three-dimensional coordinates similar to the registered object.

The device input information is predetermined information that is managed when the registered device is operated. The device input information may include fee information that represents the fee incurred by the operation of the device. The device input information may be, for example, a function executed by the user on the registered device, the operation time, the fee information of the fee to be charged in exchange for the operation, the language used, etc.

The device output information is pre-registered information for the registered device. The device output information is a list that associates the output condition that triggers the transmission of the operation instruction, with the operation) instruction to be transmitted to the registered device when the output condition is satisfied.

The number of devices installed in the management target space R1 may change. Therefore, the number of registered devices included in the registered device list is variable.

FIG. 6C is a conceptual diagram illustrating an example of the detected object list. As illustrated in FIG. 6C, the detected object list in the present embodiment includes a detected object ID, a group ID, and attribute information as data items.

The detected object ID is identification information identifying objects included in the detected object list.

The group ID is identification information that identifies a group including multiple detected objects. The group ID is given when it is determined that some of the detected objects included in the detected object list belong to the same group. An initial value (e.g., zero) is set for a group ID of detected objects that are not determined to belong to a group.

The attribute information is information that accompanies a detected object and is necessary for management. In the present embodiment, the attribute information is the position of the detected object and the image acquisition time. The position of the detected object is expressed by three-dimensional coordinates, similar to the registered object.

The number of objects detected in the management target space R1 changes from time to time. Therefore, the number of detected objects in the detected object list is variable.

Referring back to FIG. 5, further explanations will be given. The image receiving unit 11 receives an image from the monitoring device 20. The image receiving unit 11 sends the received image to the state managing unit 13 in response to a request from the state managing unit 13.

The operation information receiving unit 12 receives device operation information from the electronic device 30. The operation information receiving unit 12 sends the received device operation information to the state managing unit 13 in response to a request from the state managing unit 13. The device operation information in the present embodiment includes fee information based on the device operation.

The state managing unit 13 manages the states of the electronic device 30 and objects by using the object state managing unit 131 and the device state managing unit 132. The state managing unit 13 uses the output information determining unit 133 to determine the content of the operation instruction to be transmitted to the settlement apparatus 40.

The object state managing unit 131 updates the registered object list stored in the state storage unit 100 based on the image received from the image receiving unit 11.

The device state managing unit 132 updates the registered device list and registered object list stored in the state storage unit 100 based on the device operation information received from the operation information receiving unit 12.

The output information determining unit 133 determines the content of the operation instruction to be transmitted to the settlement apparatus 40 based on the state management information stored in the state storage unit 100. The output information determining unit 133 sends the determined operation instruction to the operation instructing unit 14.

The operation instructing unit 14 sends the operation instruction received from the state managing unit 13 to the settlement apparatus 40. The operation instruction in the present embodiment includes fee information included in the device operation information.

<<Functional Configuration of Monitoring Device>>

As illustrated in FIG. 5, the monitoring device 20 in the present embodiment includes an image acquiring unit 21 and an image transmitting unit 22.

The image acquiring unit 21 acquires an image including the vicinity of the electronic device 30 installed in the management target space R1. The image acquiring unit 21 is implemented, for example, by a process in which a program loaded into the SRAM 613 from the ROM 612 illustrated in FIG. 3 is executed by the CPU 611 and the imaging control unit 605.

The image transmitting unit 22 transmits the image acquired by the image acquiring unit 21 to the management apparatus 10. The image transmitting unit 22 is implemented, for example, by a process in which a program loaded into the SRAM 613 from the ROM 612 illustrated in FIG. 3 is executed by the CPU 611 and the external device connection I/F 616.

<<Functional Configuration of Electronic Device>>

As illustrated in FIG. 5, the electronic device 30 in the present embodiment is provided with an operation information transmitting unit 31.

The operation information transmitting unit 31 is implemented, for example, by a process in which a program loaded into the RAM 902b from the HD 909 illustrated in FIG. 4 is executed by the CPU 901 and the network I/F 950.

The operation information transmitting unit 31 transmits device operation information relating to the operation performed by the user to the management apparatus 10.

<<Functional Configuration of Settlement Apparatus>>

As illustrated in FIG. 5, the settlement apparatus 40 in the present embodiment includes a fee settlement unit 41.

The fee settlement unit 41 is implemented, for example, by a process in which a program loaded into the RAM 503 from the HD 504 illustrated in FIG. 2 is executed by the CPU 501, the display 506, and the network I/F 509.

The fee settlement unit 41 receives an operation instruction from the management apparatus 10. The fee settlement unit 41 controls the operation of the settlement apparatus 40 based on the received operation instruction. For example, the fee settlement unit 41 presents the fee information included in the operation instruction to the user. Further, the fee settlement unit 41 settles the presented fee according to the user's operation.

<Processing Procedure of Fee Management Method>

Next, the fee management method executed by the fee management system in the present embodiment will be described with reference to FIGS. 7 to 21.

<<Basic Flowchart>>

The fee management method in the present embodiment includes many double-loop processes that process all combinations of each of the pieces of data included in a certain list. Therefore, in the present embodiment, a basic flowchart illustrating the framework of the double-loop process is introduced, and the following explanation focuses on the processes in the basic flowchart. Each process in the basic flowchart is a process performed on one combination of two pieces of data.

The basic flowchart in the present embodiment includes two basic flowcharts. The first basic flowchart is used when two pieces of data included in different lists are subjected to a double-looped process. The second basic flowchart is used when two pieces of data included in the same list are subjected to a double-looped process.

Figure 7:
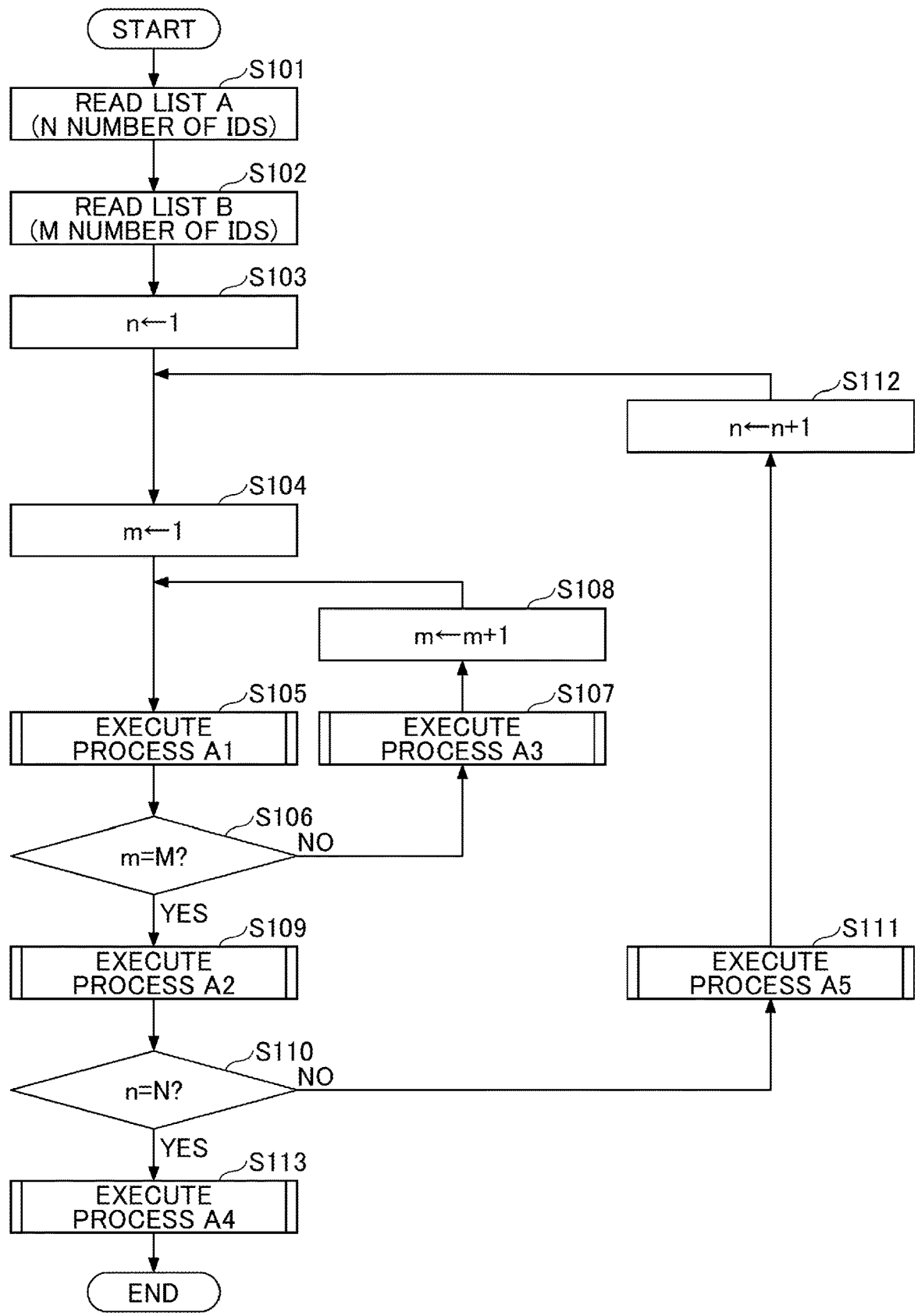
FIG. 7 illustrates an example of a first basic flowchart in one embodiment of the present invention.

FIG. 7 is a flowchart illustrating an example of the first basic flowchart in the present embodiment.

In step S101, list A is read out. The number of pieces of data in list A is N. In step S102, list B is read. The number of pieces of data in list B is M.

In step S103, a variable n is initialized to 1. In step S104, a variable m is initialized to 1. In step S105, process A1 is executed.

In step S106, it is determined whether the variable m is equal to the number of pieces of data M. This means whether the n-th piece of data in list A has been processed in combination with all of the pieces of data in list B. When the variable m is different from the number of pieces of data M (NO), the process proceeds to step S107. When the variable m is equal to the number of pieces of data M (YES), the process proceeds to step S109.

In step S107, process A3 is executed. In step S108, the variable m is incremented. Then, the process returns to step S106.

In step S109, process A2 is executed. In step S110, it is determined whether the variable n is equal to the number of pieces of data N. This means whether all of the pieces of data in list A have been processed in combination with all of the pieces of data in list B. When the variable n is different from the number of pieces of data N (NO), the process proceeds to step S111. When the variable n is equal to the number of pieces of data N (YES), the process proceeds to step S113.

In step S111, process A5 is executed. In step S112, the variable n is incremented. Then, the process returns to step S104.

In step S113, process A4 is executed. Accordingly, processing is completed for all combinations of data included in lists A and B.

Figure 8:
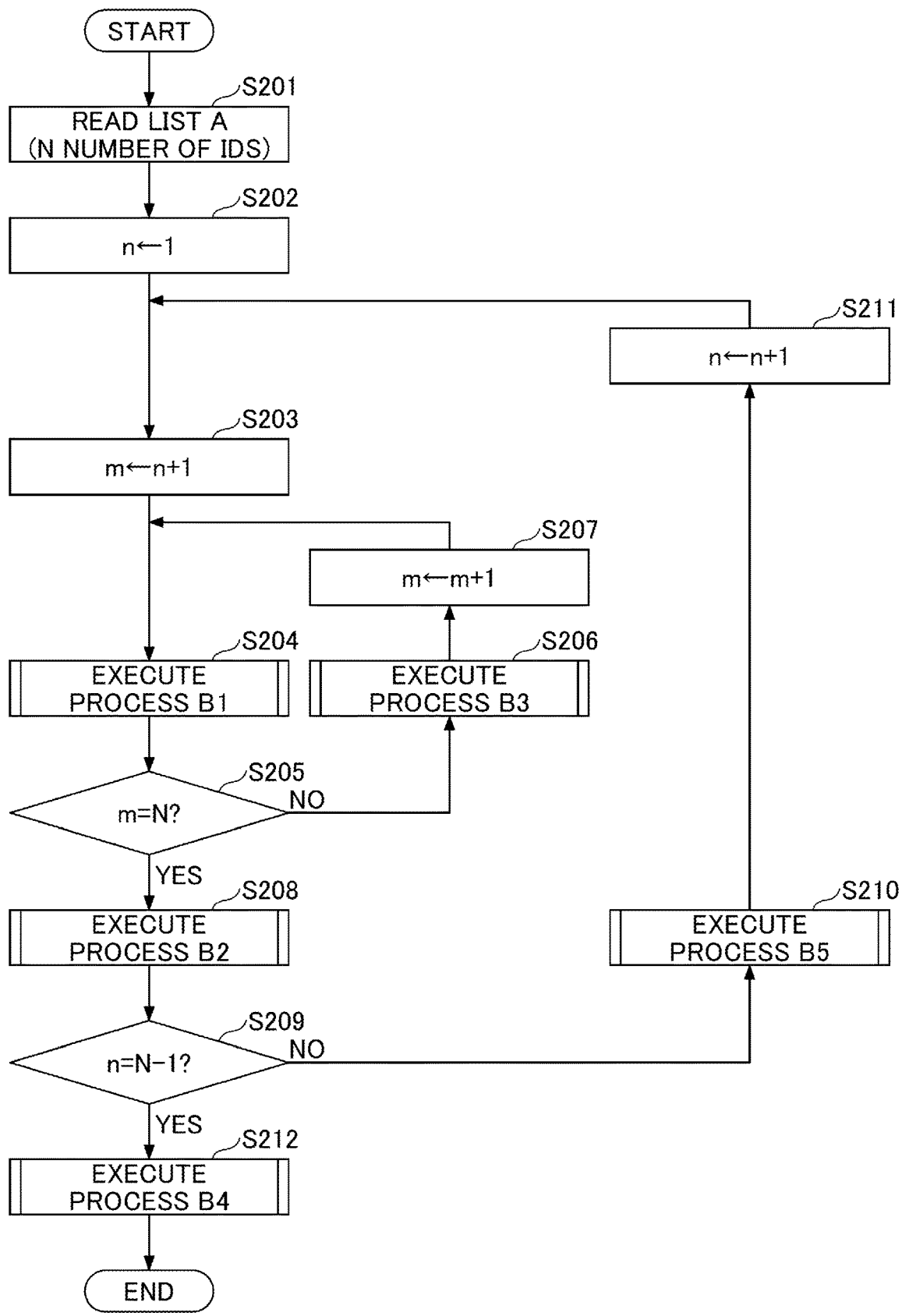
FIG. 8 illustrates an example of a second basic flowchart in one embodiment of the present invention.

FIG. 8 is a flowchart illustrating an example of the second basic flowchart in the present embodiment.

In step S201, list A is read out. The number of pieces of data in list A is N.

In step S202, a variable n is initialized to 1. In step S203, n+1 is applied to the variable m. In step S204, process B1 is executed.

In step S205, it is determined whether the variable m is equal to N. This means whether the n-th piece of data in list A has been processed in combination with all of the pieces of data in list A. When the variable m is different from N (NO), the process proceeds to step S206. When the variable m is equal to N (YES), the process proceeds to step S208.

In step S206, process B3 is executed. In step S207, the variable m is incremented. Then, the process returns to step S204.

In step S208, process B2 is executed. In step S209, it is determined whether the variable n is equal to N−1. This means whether all of the pieces of data in list A have been processed in combination with all of the other pieces of data in list A. When the variable n is different from N−1 (NO), the process proceeds to step S210. When the variable n is equal to N−1 (YES), the process proceeds to step S212.

In step S210, process B5 is executed. In step S211, variable n is incremented. Then, the process returns to step S203.

In step S212, process B4 is executed. Accordingly, the process for all combinations of data included in list A is completed.

<<Fee Management Method>>

Figure 9:
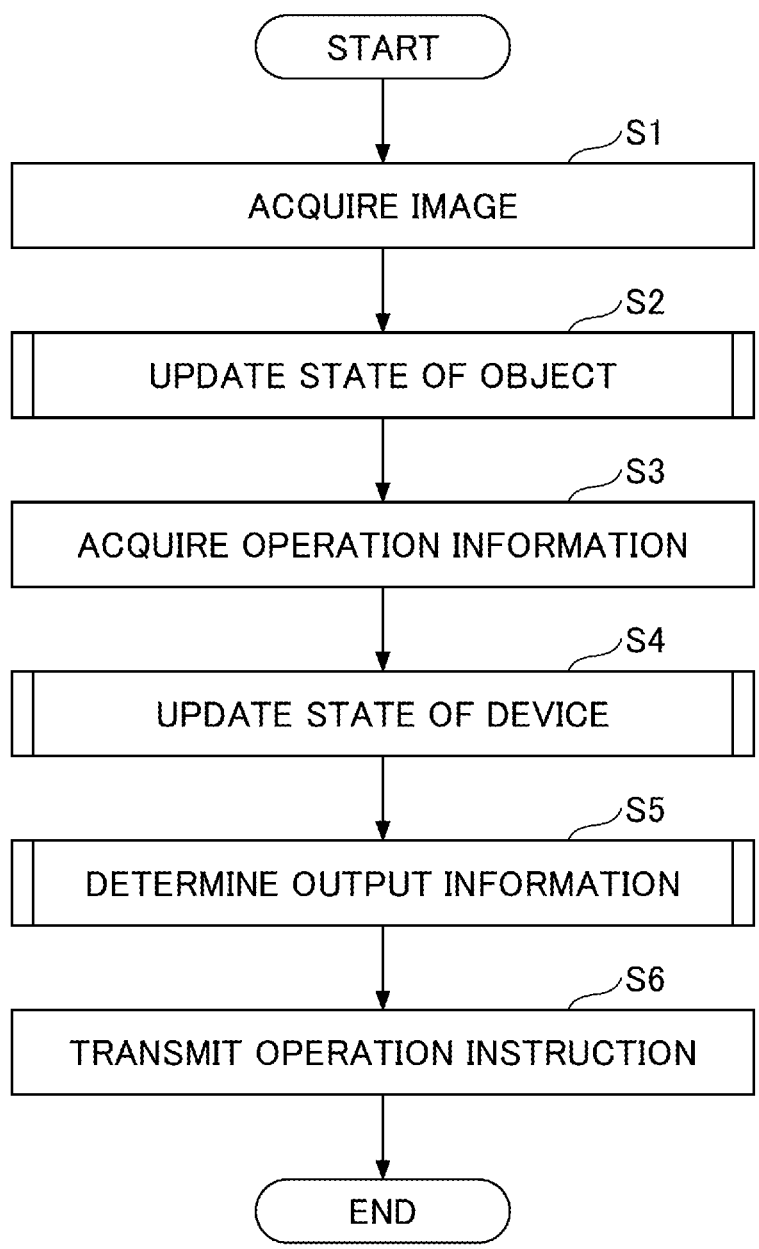
FIG. 9 illustrates an example of a fee management method in one embodiment of the present invention.

FIG. 9 is a flowchart illustrating an example of a fee management method executed by the fee management system in the present embodiment.

The fee management system repeatedly executes the flowchart illustrated in FIG. 9 at predetermined time intervals. The time interval can be set to any time interval, but as an example, the time interval is set to three seconds.

In step S1, the image acquiring unit 21 provided in the monitoring device 20 acquires a first image capturing the vicinity of the electronic device 30. Further, the image acquiring unit 21 acquires a second image capturing the vicinity of the settlement apparatus 40. The monitoring device 20 is installed such that the vicinity of the electronic device 30 and the settlement apparatus 40 installed in the management target space R1 is included in the angle of view. Therefore, the vicinity of the electronic device 30 is captured in the first image acquired by the image acquiring unit 21. Furthermore, the vicinity of the settlement apparatus 40 is captured in the second image acquired by the image acquiring unit 21.

The vicinity of the electronic device 30 or the settlement apparatus 40 is the range of positions where the user is capable of using the electronic device 30 and the settlement apparatus 40 (hereinafter, also referred to as "usable positions"). The usable position varies depending on the electronic device 30 or the settlement apparatus 40. Therefore, the usable position is to be set in advance for each of the electronic device 30 or the settlement apparatus 40. Therefore, it is advisable to set usable positions in advance for each electronic device 30 or the settlement apparatus 40. Therefore, the first image is an image capturing the electronic device 30 and the user using the electronic device 30. The second image is an image capturing the settlement apparatus 40 and the user using the settlement apparatus 40.

The monitoring device 20 may include two or more cameras. In this case, the first camera may acquire a first image capturing the usable position of the electronic device 30, and the second camera may acquire a second image capturing the usable position of the settlement apparatus 40.

Figure 10:
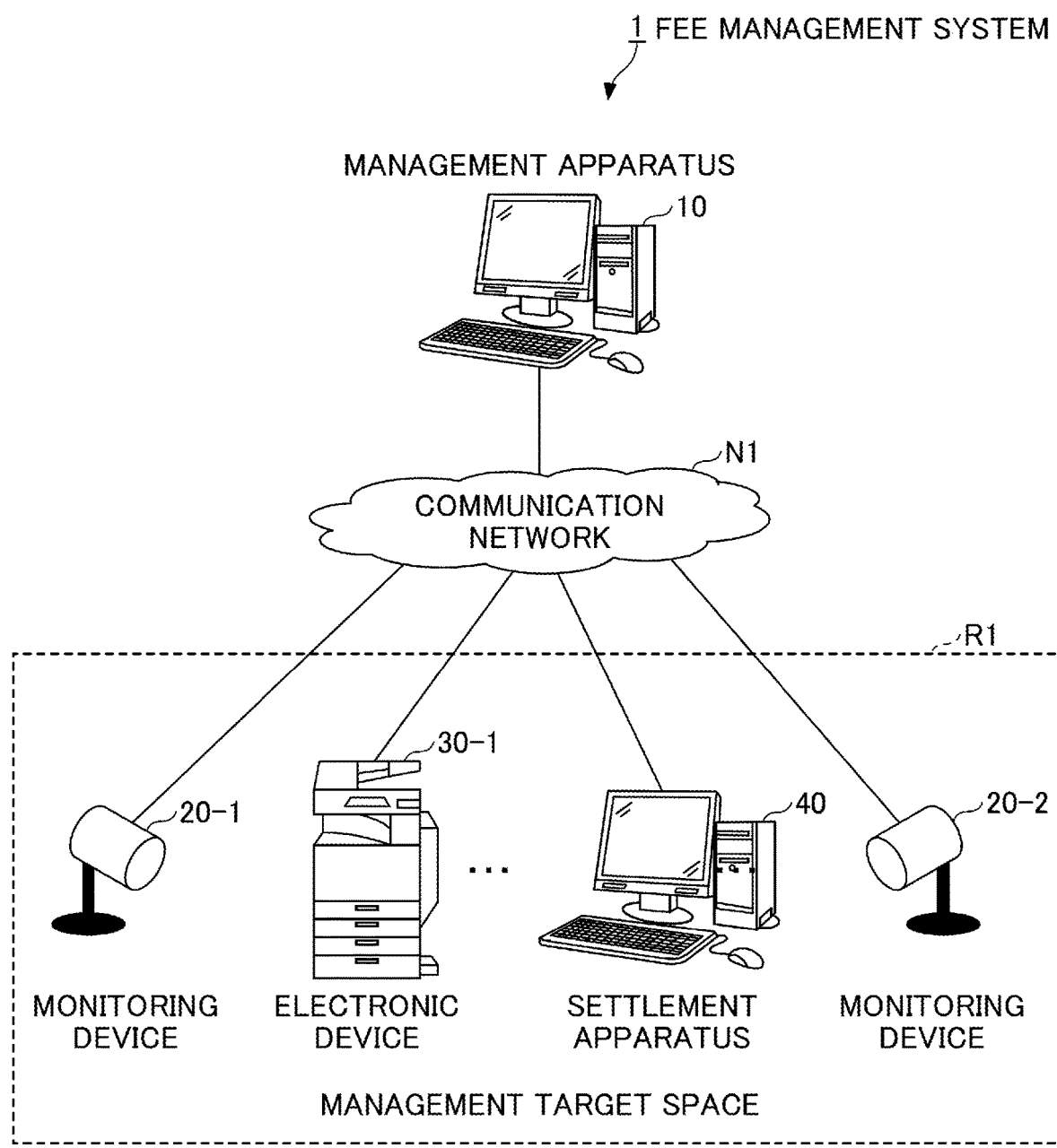
FIG. 10 illustrates an example of the overall configuration of a fee management system including multiple monitoring devices in one embodiment of the present invention.

FIG. 10 is a diagram illustrating an example of the overall configuration of the fee management system when the monitoring device 20 is configured by two or more cameras. As illustrated in FIG. 10, the fee management system 1 in this case includes a monitoring device 20-1 that captures the usable position of the electronic device 30 and a monitoring device 20-2 that captures the usable position of the settlement apparatus 40.

Figure 11:
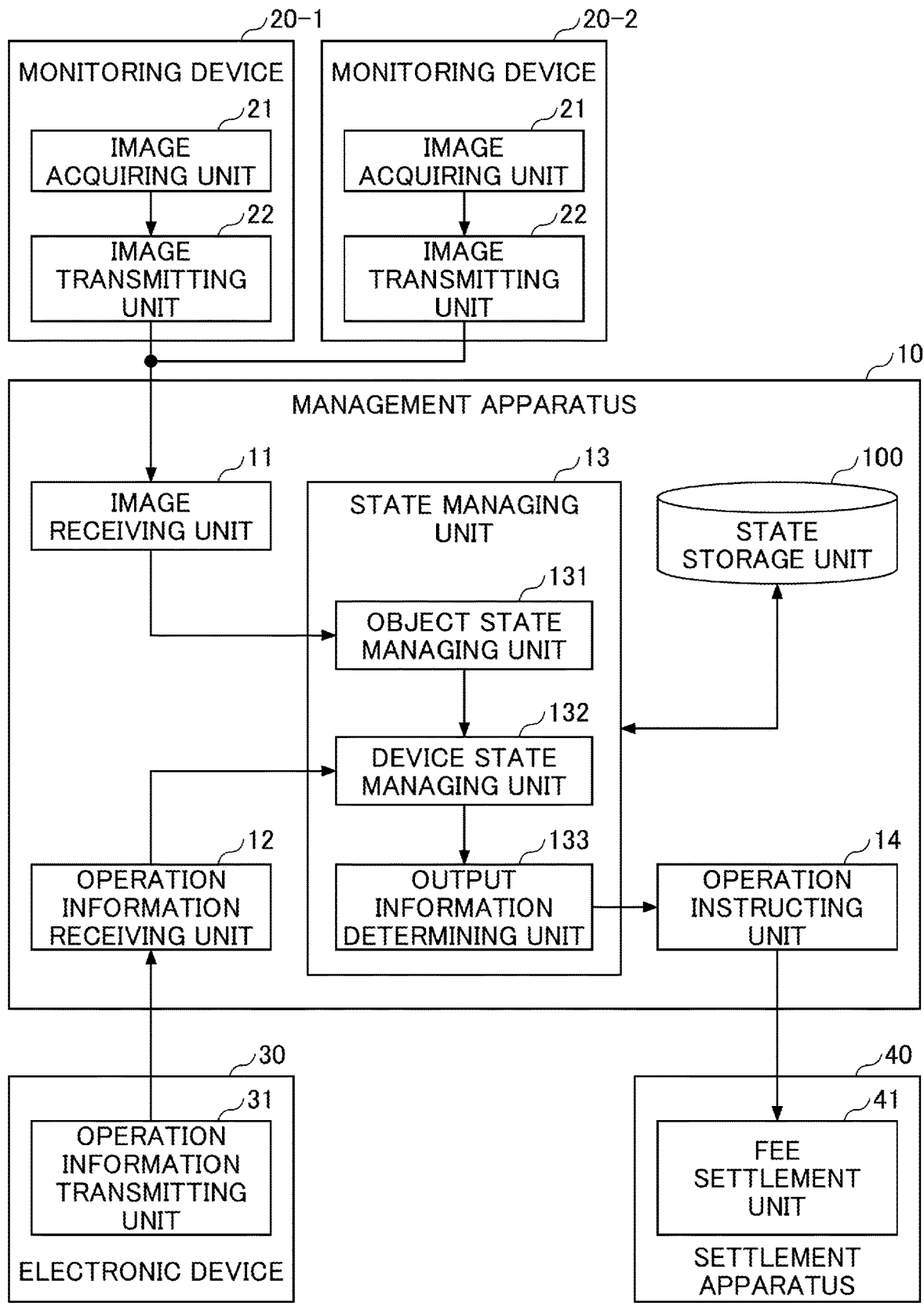
FIG. 11 illustrates an example of the functional configuration of a fee management system including multiple monitoring devices in one embodiment of the present invention.

FIG. 11 illustrates an example of the functional configuration of the fee management system when the monitoring device 20 is configured by two or more cameras. As illustrated in FIG. 11, the monitoring device 20-1 and the monitoring device 20-2 each include the image acquiring unit 21 and the image transmitting unit 22.

When the usable positions of the electronic device 30 and the settlement apparatus 40 can be captured by one camera, the usable positions of the electronic device 30 and the settlement apparatus 40 may be captured by the one camera. In this case, the first image and the second image are the same image.

Next, the image acquiring unit 21 sends the acquired first image and second image to the image transmitting unit 22. The image transmitting unit 22 receives the first image and the second image from the image acquiring unit 21. Next, the image transmitting unit 22 transmits the received first image and second image to the management apparatus 10. In the management apparatus 10, the image receiving unit 11 receives the first image and second image from the monitoring device 20.

When the monitoring device 20 is configured by two or more cameras, the image acquiring unit 21 provided in the monitoring device 20-1 sends the acquired first image to the image transmitting unit 22. Then, the image transmitting unit 22 provided in the monitoring device 20-1 sends the received first image to the management apparatus 10. Also, the image acquiring unit 21 provided in the monitoring device 20-2 sends the acquired second image to the image transmitting unit 22. Then, the image transmitting unit 22 provided in the monitoring device 20-2 sends the received second image to the management apparatus 10. In the management apparatus 10, the image receiving unit 11 receives the first image and the second image from the monitoring device 20-1 and the monitoring device 20-2.

In step S2, the state managing unit 13 provided in the management apparatus 10 requests the first and second images from the image receiving unit 11. Next, the state managing unit 13 inputs the first and second images received from the image receiving unit 11 to the object state managing unit 131.

Subsequently, the object state managing unit 131 executes an object state updating process described later to update the registered object list in the state management information stored in the state storage unit 100. When there are multiple monitoring devices 20, the object state managing unit 131 executes the object state updating process for each of the multiple images received from each of the multiple monitoring devices 20.

<<Object State Updating Process>>

Figure 12:
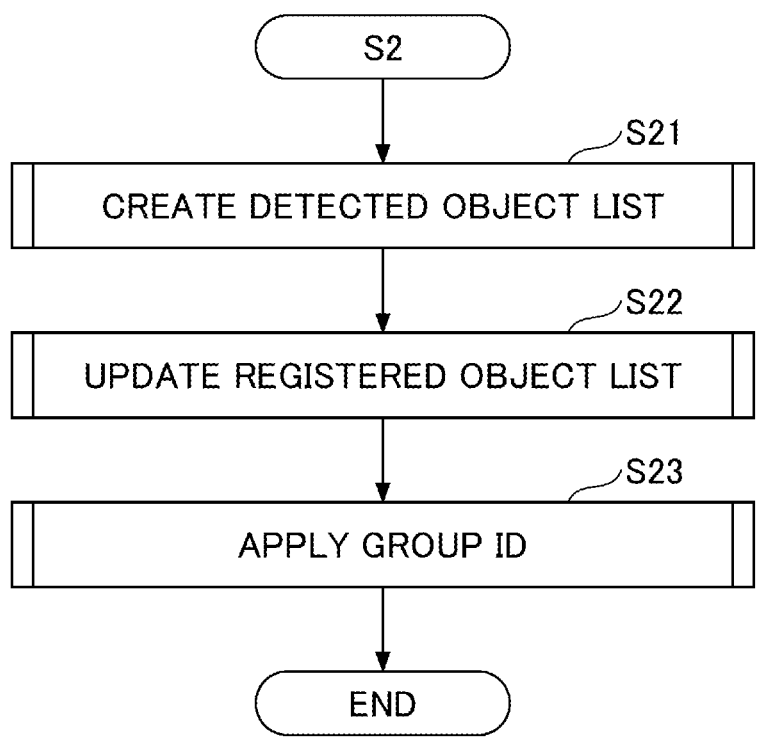
FIG. 12 illustrates an example of an object state updating process in one embodiment of the present invention.

The object state updating process in the present embodiment will be described with reference to FIGS. 12 to 17. FIG. 12 is a flowchart illustrating an example of the object state updating process (step S2 in FIG. 9) executed by the object state managing unit 131 in the present embodiment.

In step S21, the object state managing unit 131 executes a detected object list creating process described later and creates a detected object list based on the image input from the state managing unit 13.

Figure 13:
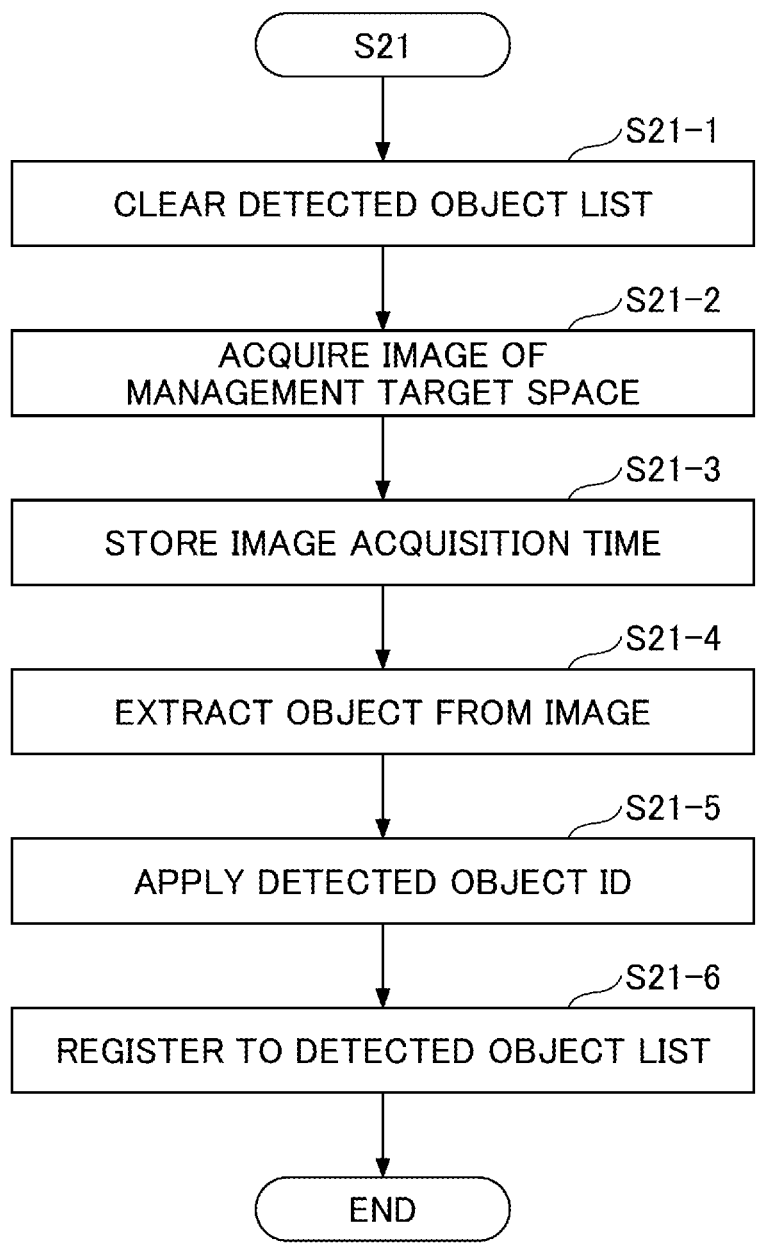
FIG. 13 illustrates an example of a detected object list creating process in one embodiment of the present invention.

FIG. 13 is a flowchart illustrating an example of the detected object list creating process (step S21 in FIG. 12) executed by the object state managing unit 131 in the present embodiment.

In step S21-1, the object state managing unit 131 clears the detected object list stored in the state storage unit 100. That is, all of the pieces of data included in the detected object list are deleted.

In step S21-2, the object state managing unit 131 acquires an image input from the state managing unit 13. The image may be one image received from one monitoring device 20 or multiple images received from multiple monitoring devices 20.

Next, the object state managing unit 131 divides the image into predetermined blocks. Subsequently, for each block, the object state managing unit 131 measures the distance between the camera and the object captured in the image. Furthermore, the object state managing unit 131 obtains three-dimensional coordinates from the measured distance. As the method for converting the distance into three-dimensional coordinates, a known method may be used.

In step S21-3, the object state managing unit 131 acquires the image acquisition time T from the acquired image. If the image acquisition time cannot be acquired from the image, the current time may be acquired as the image acquisition time T.

In step S21-4, the object state managing unit 131 analyzes the acquired image and detects the object captured in the image. In the present embodiment, the person captured in the image is detected.

The detection of the person can be done by using a known technique. For example, pattern matching using a machine learning model can be used. Specifically, a known region-based convolutional neural network (R-CNN) or the like can be used to cut out a person from an image.

Furthermore, the accuracy of detection can be improved by pattern-matching the cut out image of the person with a prestored comparison image. Note that other than these methods, various known person detection methods can be used.

In step S21-5, the object state managing unit 131 applies a detected object ID that identifies the detected object.

In step S21-6, the object state managing unit 131 registers the detected object ID and attribute information (the position of the detected object and the image acquisition time) in the detected object list. At this stage, an initial value indicating that the object does not belong to a group is set as the group ID.

Referring back to FIG. 12, further explanations will be given. In step S22, the object state managing unit 131 executes a registered object list updating process described later and updates the registered object list based on the detected object list.

Figure 14:
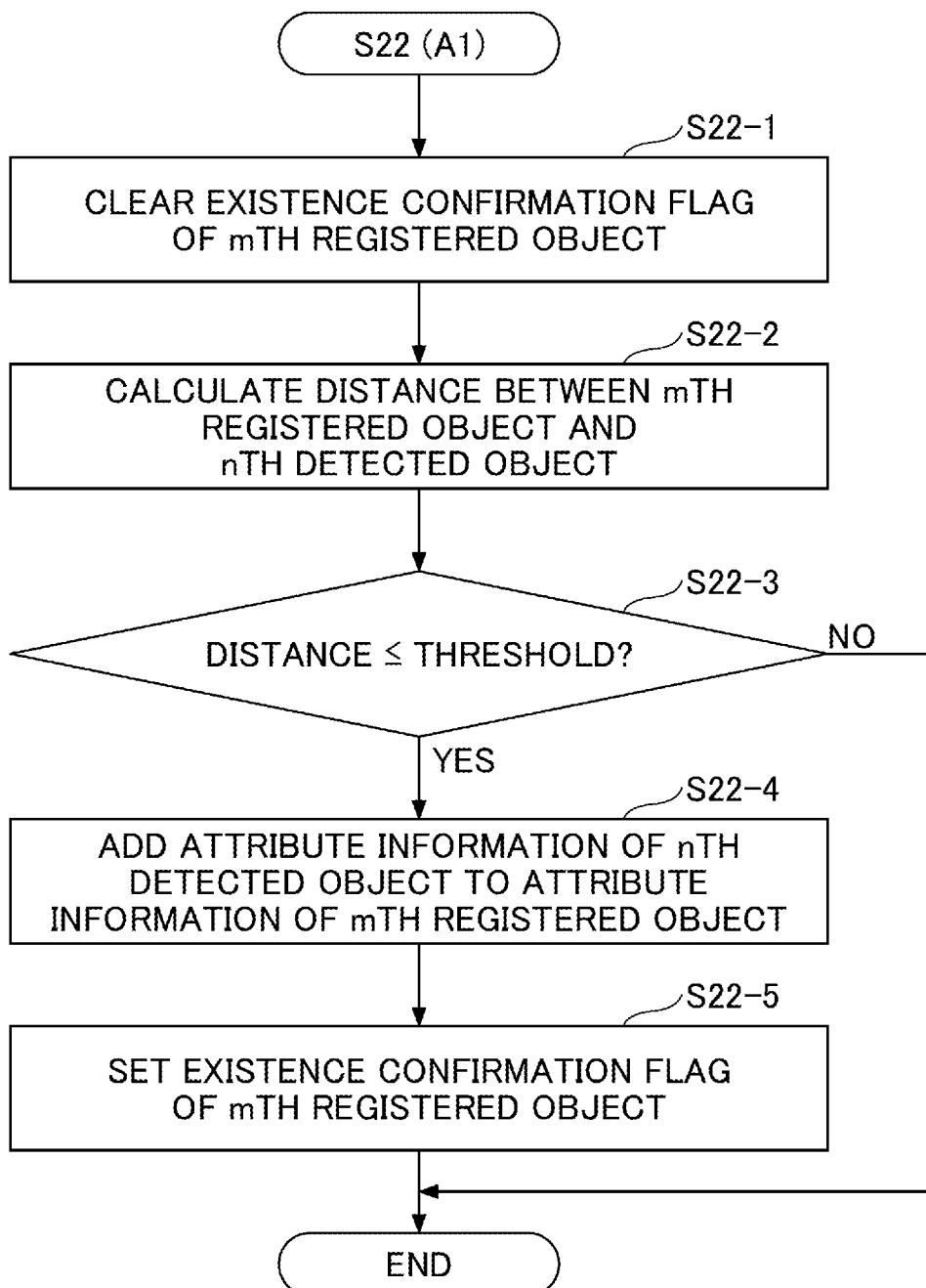
FIG. 14 illustrates an example of a registered object list updating process in one embodiment of the present invention.
Figure 15:
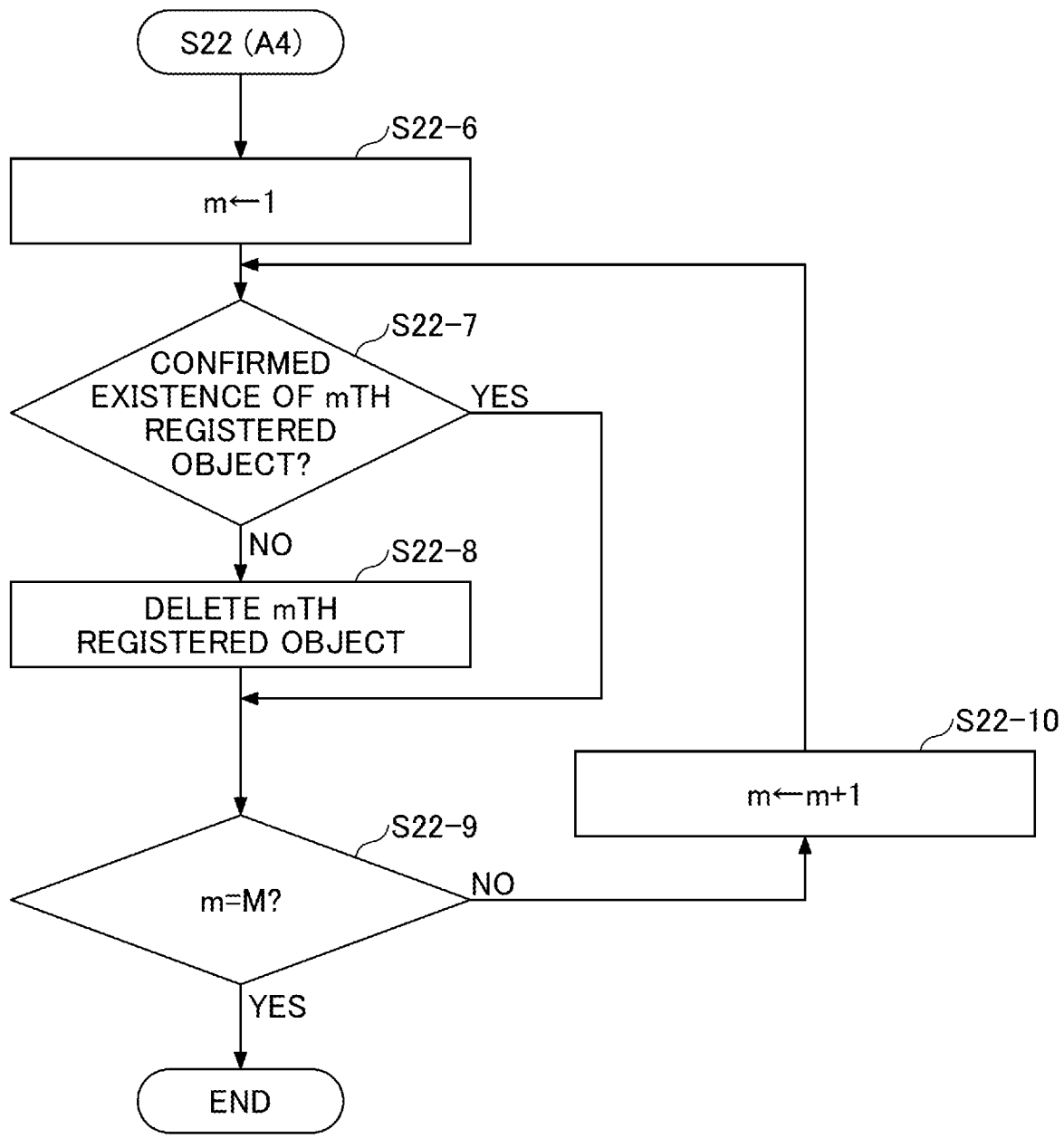
FIG. 15 illustrates an example of a registered object list updating process in one embodiment of the present invention.

FIG. 14 and FIG. 15 are flowcharts illustrating an example of the registered object list updating process (step S22 in FIG. 12) executed by the object state managing unit 131 in the present embodiment.

The registered object list updating process is executed in the framework of the first basic flowchart (see FIG. 7). Specifically, process A1 (FIG. 14) and process A4 (FIG. 15) are executed for all combinations of detected objects and registered objects, with the detected object list as list A and the registered object list as list B. Note that there is no process corresponding to processes A2, A3 and A5.

FIG. 14 is a flowchart illustrating an example of process A1 of the registered object list updating process. Process A1 is process for determining that the registered object and the detected object are the same and for updating the position of the registered object.

Here, processing is executed on the combination of the n-th detected object in the detected object list and the m-th registered object in the registered object list.

In step S22-1, the object state managing unit 131 clears the existence confirmation flag of the m-th registered object. That is, zero is set in the existence confirmation flag of the m-th registered object. This means that it is unknown whether the registered object exists in the management target space R1.

In step S22-2, the object state managing unit 131 calculates the distance X between the three-dimensional coordinates of the m-th registered object and the three-dimensional coordinates of the n-th detected object.

In step S22-3, the object state managing unit 131 determines whether the distance X is less than or equal to a predetermined threshold (for example, one meter). When the distance X exceeds the threshold (NO), the object state managing unit 131 ends the process A1. This means that it has been determined that the two persons are not the same person because the distance between the two persons is far. When the distance X is less than or equal to the threshold (YES), the object state managing unit 131 proceeds to step S22-4.

In step S22-4, the object state managing unit 131 adds the three-dimensional position and the image acquisition time of the n-th detected object to the attribute information of the m-th registered object. This means that, because the distance between these objects is close, these objects are the same person and the position of the n-th detected object is determined to be the position of the m-th registered object at image acquisition time T.

As long as the registered object is detected from the image, the attribute information of the registered object list will increase each time the object state updating process is executed. Conversely, the attribute information of the registered object list represents the time series of the position where the registered object is detected in the management target space. Therefore, the movement of the registered object can be tracked by the attribute information of the registered object list.

In step S22-5, the object state managing unit 131 sets the existence confirmation flag of the m-th registered object. That is, 1 is set in the existence confirmation flag of the m-th registered object. This means that, because an object matching the registered object has been detected in step S22-3, it has been determined that the registered object exists in the management target space R1 also at the image acquisition time T.

FIG. 15 is a flowchart illustrating an example of process A4 of the registered object list updating process. Process A4 is a process to delete, from the registered object list, the registered object whose existence has not been confirmed in process A1.

In step S22-6, the object state managing unit 131 initializes the variable m to 1.

In step S22-7, the object state managing unit 131 determines whether the existence of the m-th registered object has been confirmed. Specifically, the object state managing unit 131 determines whether the existence confirmation flag is 1 or 0. When the existence confirmation flag is 1 (YES), the object state managing unit 131 proceeds to step S22-9. When the existence confirmation flag is 0 (NO), the object state managing unit 131 proceeds to step S22-8.

In step S22-8, the object state managing unit 131 deletes the m-th registered object from the registered object list.

In step S22-9, the object state managing unit 131 determines whether the variable m is equal to the number of pieces of data M. When the variable m is different from the number of pieces of data M (NO), the object state managing unit 131 proceeds to step S22-10. When the variable m is equal to the number of pieces of data M (YES), the object state managing unit 131 ends the process.

In step S22-10, the object state managing unit 131 increments the variable m. Then, the object state managing unit 131 returns the processing to step S22-7.

Referring back to FIG. 12, further explanations will be given. In step S23, the object state managing unit 131 executes the group ID applying process described later to apply a group ID to registered objects included in the registered object list.

The group ID applying process is executed in the framework of the second basic flowchart (see FIG. 8). Specifically, process B1 (FIG. 16 or 17) is executed for all combinations of two registered objects, with the registered object list as list A. There is no process corresponding to processes B2 to B5.

There are various methods for determining whether a certain object and another object belong to the same group. In the present embodiment, group determination according to position proximity and group determination according to group action are explained. However, the method of group determination is not limited to these, and any technique can be used as long as the method enables group determination of objects from images.

Figure 16:
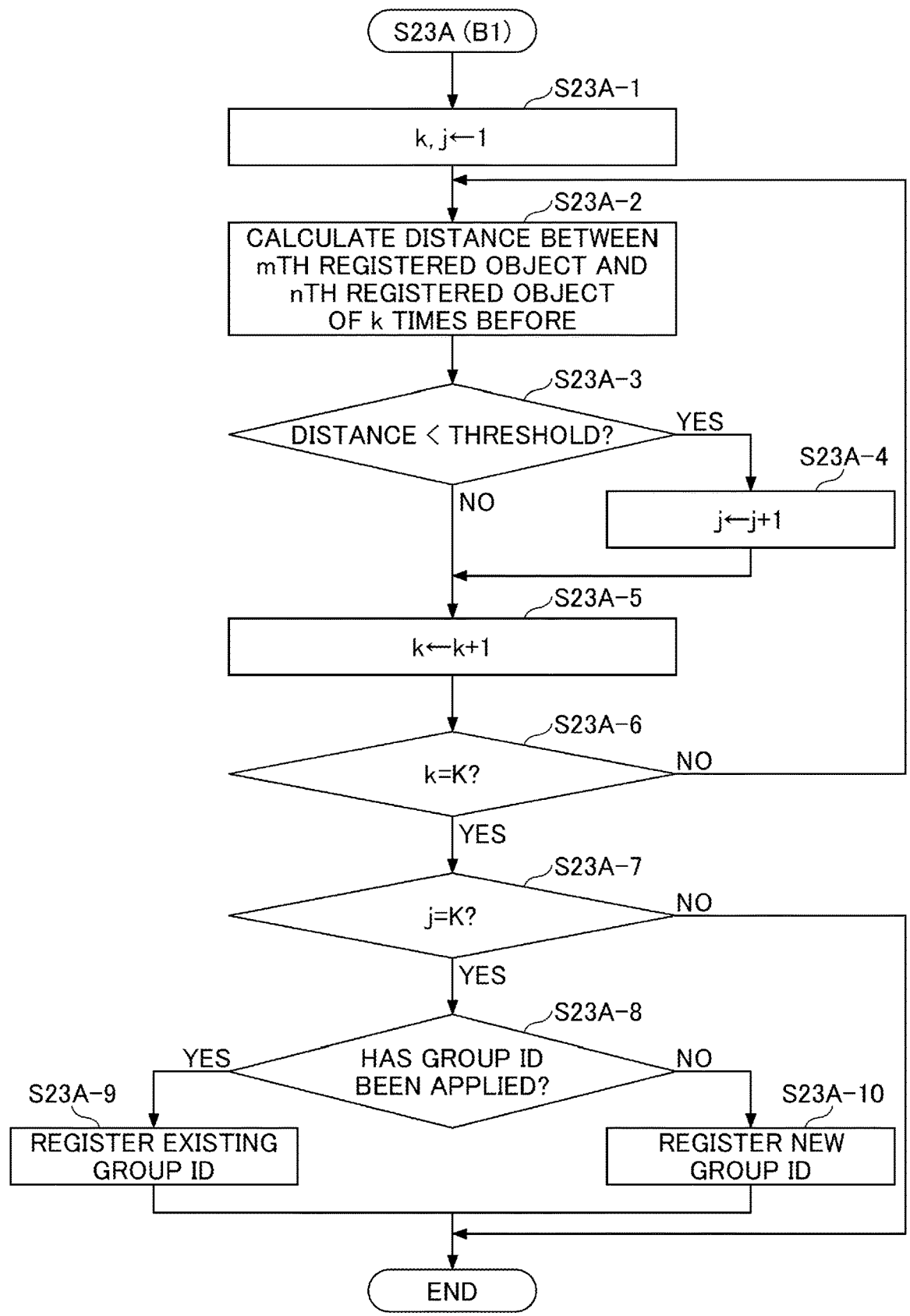
FIG. 16 illustrates a first example of a group ID applying process in one embodiment of the present invention.

FIG. 16 is a flowchart illustrating a first example of a group ID applying process (step S23 in FIG. 12) executed by the object state managing unit 131 in the present embodiment. The first example of the group ID applying process is group determination by position proximity.

Group determination by position proximity is a process in which two objects at positions close to each other detected consecutively for the most recent predetermined number of times, are registered as a group. The predetermined number of times is, for example, five times. When the time interval for executing the fee management method is three seconds, two objects detected at positions in close proximity consecutively for 15 seconds would be determined as belonging to the same group.

Here, the process is executed on a combination of the m-th registered object and the n-th registered object in the registered object list.

In step S23A-1, the object state managing unit 131 initializes the variable k and the variable j to 1. The variable k is a counter representing the number of times it has been determined whether two objects are close together. The variable j is a counter representing the number of times that it has been determined that two objects are close together.

In step S23A-2, the object state managing unit 131 calculates the distance X between the three-dimensional coordinates before k times of the m-th registered object and the three-dimensional coordinates before k times of the n-th registered object.

In step S23A-3, the object state managing unit 131 determines whether the distance X is less than a predetermined threshold (for example, one meter). When the distance X is less than the threshold (YES), the object state managing unit 131 proceeds to step S23A-4. When the distance X is greater than or equal to the threshold (NO), the object state managing unit 131 proceeds to step S23A-5.

In step S23A-4, the object state managing unit 131 increments the variable j.

In step S23A-5, the object state managing unit 131 increments the variable k.

In step S23A-6, the object state managing unit 131 determines whether the variable k is equal to a predetermined number of times K. When the variable k is different from the predetermined number of times K (NO), the object state managing unit 131 returns step S23A-2. When the variable k is equal to the predetermined number of times K (YES), the object state managing unit 131 proceeds to step S23A-7.

In step S23A-7, the object state managing unit 131 determines whether the variable j is equal to the predetermined number of times K. When the variable j is different from the predetermined number of times K (NO), the object state managing unit 131 ends the process. When the variable j is equal to the predetermined number of times K (YES), the object state managing unit 131 proceeds to step S23A-8.

In step S23A-8, the object state managing unit 131 determines whether a group ID is applied to either the m-th registered object or the n-th registered object. When a group ID is applied (YES), the object state managing unit 131 proceeds to step S23A-9. When no group ID is applied (NO), the object state managing unit 131 proceeds to step S23A-10.

In step S23A-9, the object state managing unit 131 determines either the group ID applied to the m-th registered object or the group ID applied to the n-th registered object, as the group ID to be applied. Next, in the registered object list, the object state managing unit 131 sets the determined group ID to the group ID of the m-th registered object and the n-th registered object.

The object state managing unit 131 determines the group ID to be applied as follows. When a group ID is applied to only one registered object, this group ID is determined to be the group ID to be applied. That is, the registered object without a group ID is added to the members of an existing group.

When a group ID is applied to both registered objects, first, the registered objects corresponding to the m+1-th registered object and onwards are sorted by group IDs, to identify the registered objects with the same group ID as the m-th registered object. Next, the group IDs of the m-th registered object and all of the identified registered objects are updated to be the group ID of the n-th registered object. Accordingly, all members of the group to which the m-th registered object belongs, will belong to the same group as the n-th registered object. Thus, the group to which three or more registered objects belong can be identified.

In step S23A-10, the object state managing unit 131 issues a new group ID that does not overlap with any other group ID. Next, in the registered object list, the object state managing unit 131 sets the issued new group ID to the group ID of the m-th registered object and the n-th registered object.

Figure 17:
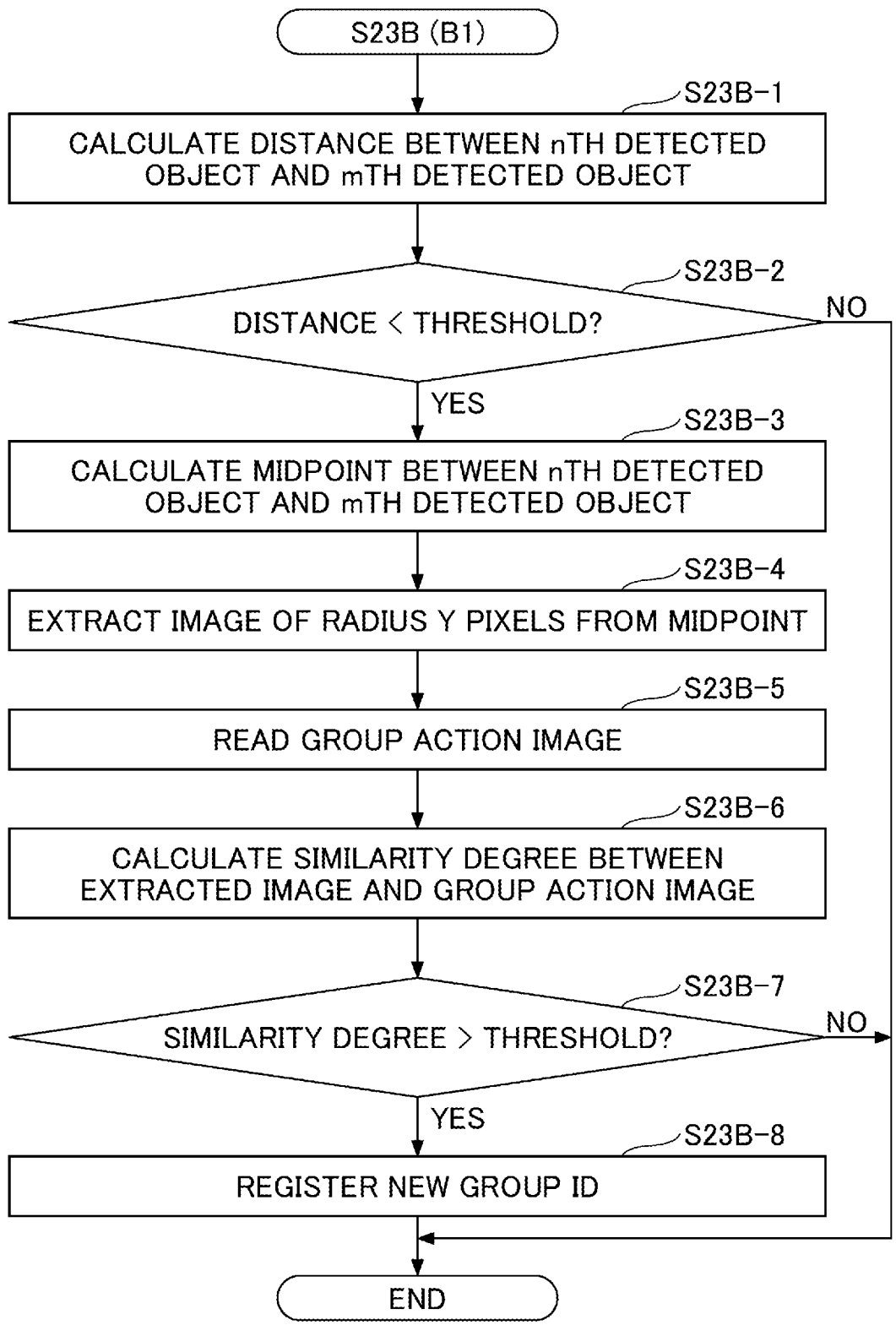
FIG. 17 illustrates a second example of a group ID applying process in one embodiment of the present invention.

FIG. 17 is a flowchart illustrating a second example of a group ID applying process (step S23 in FIG. 12) executed by the object state managing unit 131 in the present embodiment. The second example of group ID applying process is group determination according to group action.

Group determination according to group action is processing in which group determination is done by image analysis after a detected object list is created. Therefore, when group determination is done according to group action, step S23 is executed between step S21 and step S22.

Here, processing is executed on a combination of the m-th detected object and the n-th detected object in the detected object list.

In step S23B-1, the object state managing unit 131 calculates the distance X between the three-dimensional coordinates of the n-th detected object and the three-dimensional coordinates of the m-th detected object.

In step S23B-2, the object state managing unit 131 determines whether the distance X is less than a predetermined threshold (for example, one meter). When the distance X is greater than or equal to the threshold (NO), the object state managing unit 131 ends the process. When the distance X is less than the threshold (YES), the object state managing unit 131 proceeds to step S23B-3.

In step S23B-3, the object state managing unit 131 calculates the midpoint between the three-dimensional coordinates of the n-th detected object and the three-dimensional coordinates of the m-th detected object. Specifically, the object state managing unit 131 divides the sum each of the X coordinates, the Y coordinates, and the Z coordinates of the two detected objects, by two.

In step S23B-4, the object state managing unit 131 extracts an image P having a radius Y of Y pixels centered on the midpoint. The radius Y is set such that the range included in the image P becomes approximately one meter in distance in a real space, according to the resolution of the image.

In step S23B-5, the object state managing unit 131 reads a group action image stored in advance. The group action image is a set of images representing actions determined to belong to the same group. An example is an image of one person putting an article in a shopping basket held by another person.

In step S23B-6, the object state managing unit 131 calculates the similarity degree between the image P and each group action image by pattern matching or the like.

In step S23B-7, the object state managing unit 131 determines whether any of the calculated similarity degrees exceeds a predetermined threshold. When there is a similarity degree exceeding the threshold (YES), the object state managing unit 131 proceeds to step S23B-8. When there is no similarity degree exceeding the threshold (NO), the object state managing unit 131 ends the process.

In step S23B-8, the object state managing unit 131 issues a new group ID that does not overlap with any other group ID. Next, in the detected object list, the object state managing unit 131 sets the issued new group ID to the group ID of the m-th detected object and the n-th detected object.

In step S22-4 (see FIG. 14) of the registered object list updating process executed thereafter, the object state managing unit 131 sets the group ID of the detected object determined to be the same object, to the group ID of the registered object. When an existing group ID is applied to the registered object, steps S23A-8 through S23A-10 (see FIG. 16) of the first example of the group ID applying process are executed.

Referring back to FIG. 9, further explanations will be given. In step S3, the operation information transmitting unit 31 provided in the electronic device 30-1 determines whether the operation content is information to be reported to the management apparatus 10 according to the operation performed by the user at the electronic device 30-1. This determination is made according to whether the operation content matches any predetermined operation content.

When the operation information transmitting unit 31 determines that the operation content is to be reported, the operation information transmitting unit 31 transmits device operation information relating to the device operation to the management apparatus 10. In the management apparatus 10, the operation information receiving unit 12 receives the device operation information from the electronic device 30-1.

The operation contents and operation information in the present embodiment are exemplified below.

Example 1

Operation content: Device login

Operation information: Registered device ID, device authentication ID (if authentication is required), login time

Example 2

Operation content: Process for which a fee is incurred (copy output, use of volume-based charging type software, etc.)

Operation information: Registered device ID, device authentication ID (if authentication is required), fee, input data, language used

Example 3

Operation content: None

Operation information: State information such as maintenance and energy saving mode

Example 4

Operation content: Action to remove article from the article shelf

Operation information: Registered device ID, article identification information, and article price The registered device ID is identification information included in the registered device list stored in the state storage unit 100 of the management apparatus 10. The registered device ID is allocated to each of the electronic devices 30 installed in the management target space R1. The device authentication ID is authentication information used by the user of the electronic device 30 for using the electronic device 30.

In step S4, the state managing unit 13 provided in the management apparatus 10 requests operation information from the operation information receiving unit 12. Next, the state managing unit 13 inputs the operation information received from the operation information receiving unit 12 to the device state managing unit 132.

Subsequently, the device state managing unit 132 executes the device state updating process described later to update the registered device list of the state management information stored in the state storage unit 100.

<<Device State Updating Process>>

Figure 18:
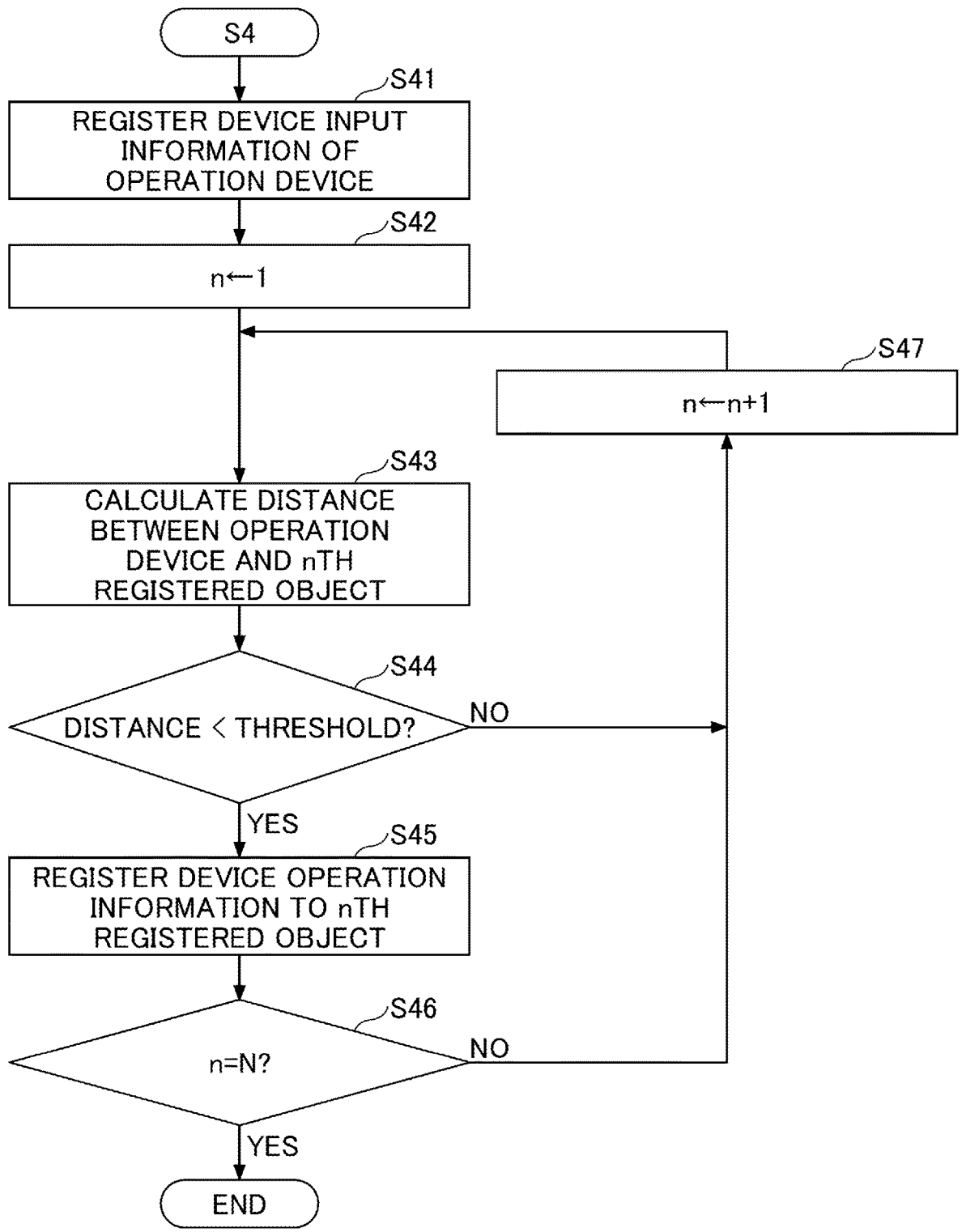
FIG. 18 illustrates an example of a device state updating process in one embodiment of the present invention.

The device state updating process in the present embodiment will be described with reference to FIG. 18. FIG. 18 is a flowchart illustrating an example of the device state updating process (step S4 in FIG. 9) executed by the device state managing unit 132 in the present embodiment.

In step S41, the device state managing unit 132 identifies the registered device included in the registered device list by the registered device ID included in the device operation information. Next, the device state managing unit 132 sets the received device operation information in the device input information of the identified registered device.

In step S42, the device state managing unit 132 initializes the variable n to 1.

In step S43, the device state managing unit 132 calculates the distance X between the three-dimensional coordinates of the identified registered device and the latest three-dimensional coordinates of the n-th registered object. The three-dimensional coordinates of the registered device are set in advance by the same method as that of the three-dimensional coordinates of the registered object. The installation position of the registered device may be moved, and, therefore, it is necessary to update the three-dimensional coordinates of the registered device periodically, but the update frequency can be low.

In step S44, the device state managing unit 132 determines whether the distance X is less than a predetermined threshold (for example, one meter). When the distance X is greater than or equal to the threshold (NO), the device state managing unit 132 proceeds to step S48. When the distance X is less than the threshold (YES), the device state managing unit 132 proceeds to step S45.

In step S45, the device state managing unit 132 adds the device input information of the identified registered device to the device operation information of the n-th registered object. The device operation information of the registered object list is configured such that a predetermined number of pieces of device input information can be stored.

In step S46, the device state managing unit 132 determines whether the variable n is equal to the number of pieces of data N. When the variable n is different from the number of pieces of data N (NO), the device state managing unit 132 proceeds to step S47. When the variable n is equal to the number of pieces of data N (YES), the device state managing unit 132 ends the process.

In step S47, the device state managing unit 132 increments the variable n. Then, the device state managing unit 132 returns the processing to step S43.

The following is explained with reference to FIG. 9. In step S5, the output information determining unit 133 provided in the management apparatus 10 executes an output information determining process described later and determines an operation instruction to be transmitted to the settlement apparatus 40 based on the state management information stored in the state storage unit 100.

<<Output Information Determining Process>>

Figure 19:
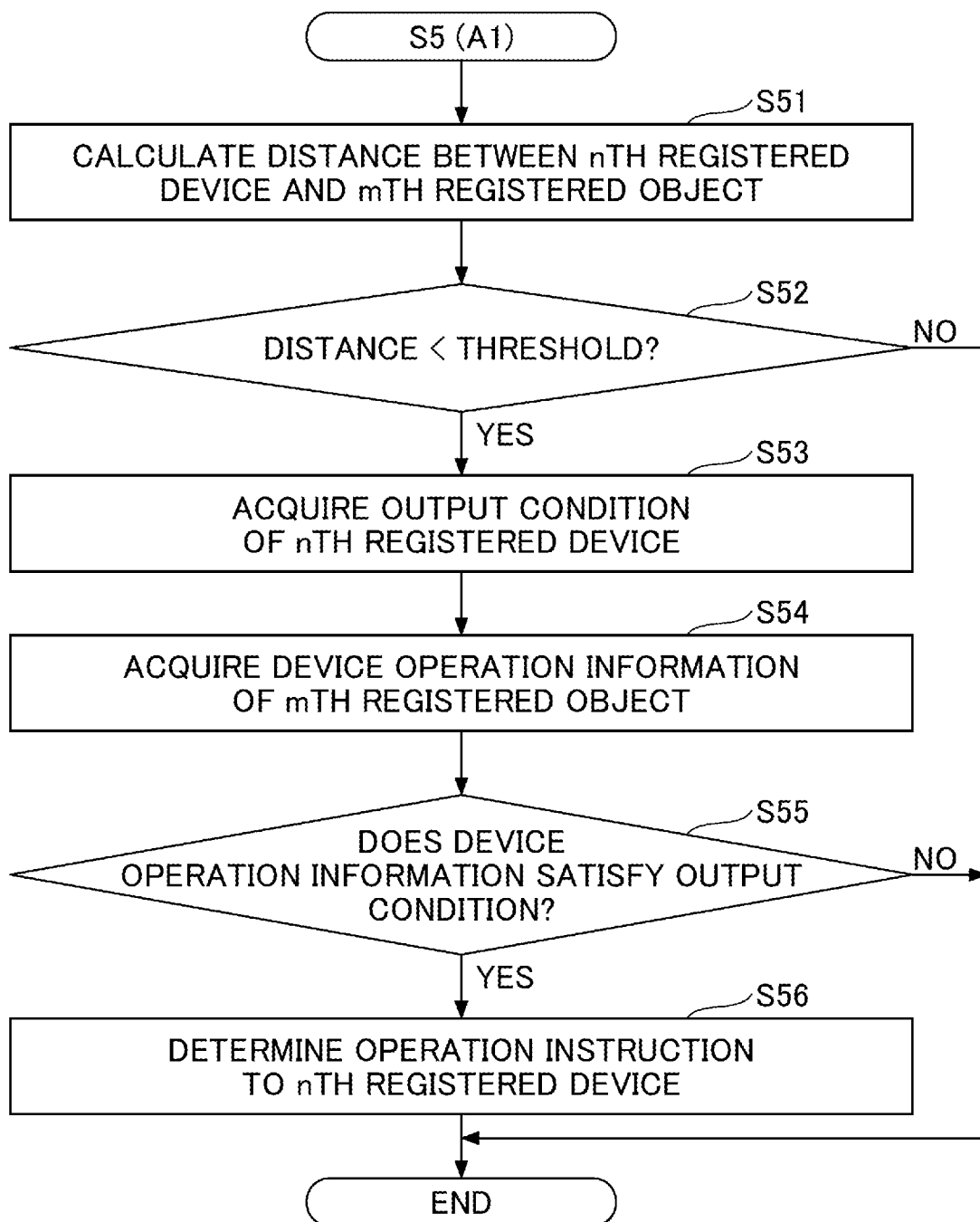
FIG. 19 illustrates an example of an output information determining process in one embodiment of the present invention.

Here, an output information determining process in the present embodiment will be described with reference to FIGS. 19 and 20. FIG. 19 is a flowchart illustrating an example of an output information determining process (step S5 in FIG. 9) executed by the output information determining unit 133 in the present embodiment.

The output information determining process is executed in the framework of the first basic flowchart (see FIG. 7). Specifically, process A1 (see FIG. 19) is executed for all combinations of registered devices and registered objects, with the registered device list as list A, and the registered object list as list B. There is no process corresponding to processes A2 to A5.

Here, processing is executed on the combination of the n-th registered device in the registered device list and the m-th registered object in the registered object list.

In step S51, the output information determining unit 133 calculates the distance X between the latest three-dimensional coordinates of the n-th registered device and the latest three-dimensional coordinates of the m-th registered object.

In step S52, the output information determining unit 133 determines whether the distance X is less than a predetermined threshold (for example, one meter). When the distance X is greater than or equal to the threshold (NO), the device state managing unit 132 ends the process. When the distance X is less than the threshold (YES), the device state managing unit 132 proceeds to step S53.

In step S53, the output information determining unit 133 acquires the output condition included in the device output information of the n-th registered device from the registered device list stored in the state storage unit 100.

In step S54, the output information determining unit 133 acquires the device operation information of the m-th registered object from the registered object list stored in the state storage unit 100.

In step S55, the output information determining unit 133 determines whether any of the pieces of device operation information acquired in step S54 satisfies the output condition acquired in step S53. When all of the pieces of device operation information do not satisfy the output condition (NO), the device state managing unit 132 ends the process. If any of the pieces of device operation information satisfies the output condition (YES), the device state managing unit 132 proceeds to step S56.

In step S56, the output information determining unit 133 acquires an operation instruction corresponding to the output condition acquired in step S53 from the device output information of the n-th registered device. The operation instruction of the registered device may include one that adaptively performs processing according to the attribute information of the registered device. For example, a condition such as not transmitting an operation instruction when the registered device is in an inoperable state may be included. An inoperable state is, for example, a power-off state or a paused state.

Figure 20:
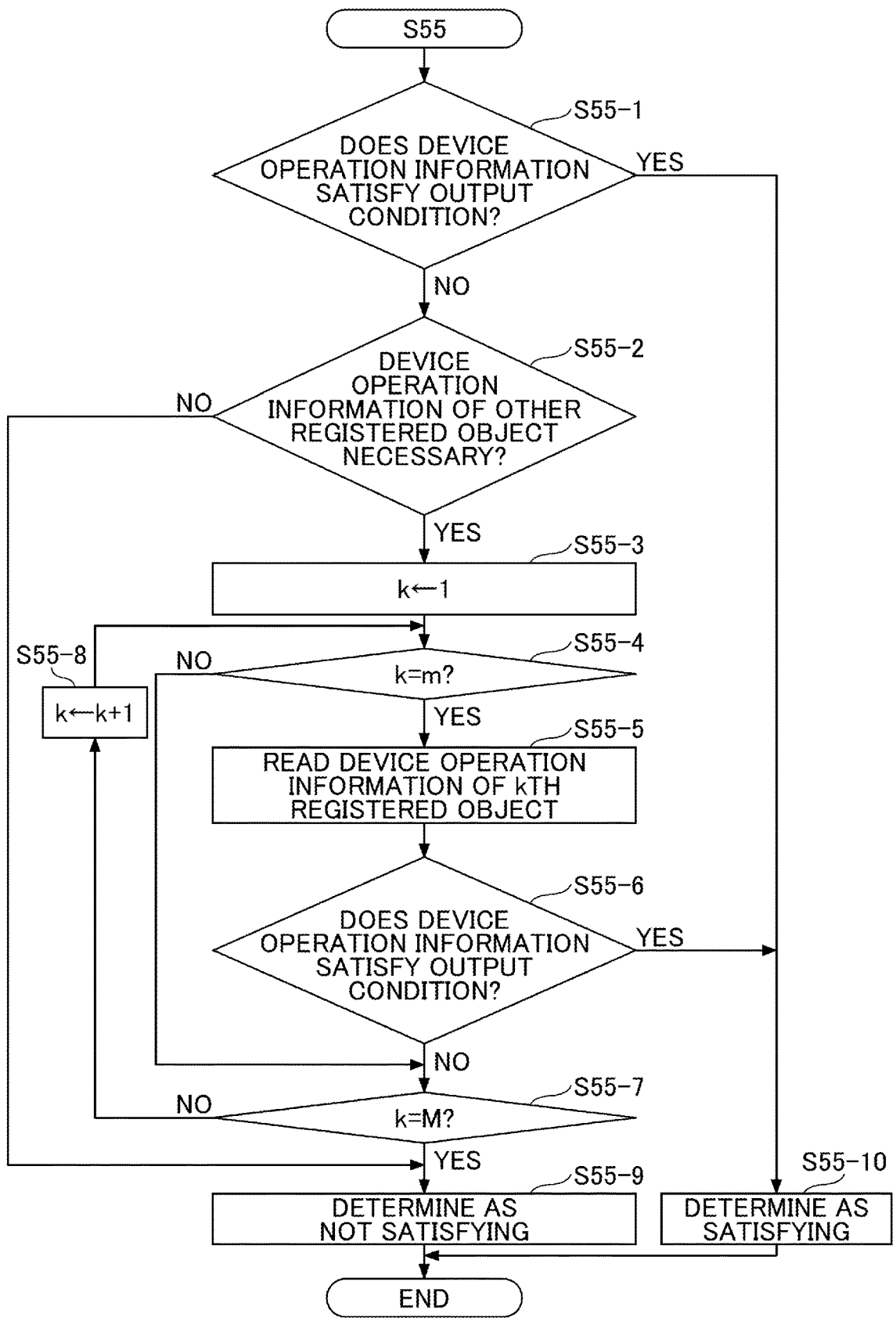
FIG. 20 illustrates an example of an output condition determining process in one embodiment of the present invention.

FIG. 20 is a flowchart illustrating a modified example of an output condition determining process (step S55 in FIG. 19) executed by the output information determining unit 133 in the present embodiment.

In the output information determining process illustrated in FIG. 19, it is determined whether the output condition is satisfied or not based only on the device operation information of the m-th registered object in step S55. In the output information determining process illustrated in FIG. 20, it is determined whether the output condition is satisfied or not by referring to device operation information other than that of the m-th registered device.

In step S55-1, the output information determining unit 133 determines whether any of the pieces of device operation information of the m-th registered object satisfies the output condition of the n-th registered device. When any of the pieces of device operation information satisfies the output condition (YES), the output information determining unit 133 proceeds to step S55-10. When all of the pieces of device operation information do not satisfy the output condition (NO), the output information determining unit 133 proceeds to step S55-2.

In step S55-2, the output information determining unit 133 determines whether the device operation information of another registered object is necessary based on the output condition of the n-th registered device. When the device operation information of another registered object is necessary (YES), the output information determining unit 133 proceeds to step S55-3. When the device operation information of another registered object is not necessary (NO), the output information determining unit 133 proceeds to step S55-9.

In step S55-3, the output information determining unit 133 initializes the variable k to 1.

In step S55-4, the output information determining unit 133 determines whether the variable k is equal to the variable m. When the variable k is equal to the variable m (YES), the output information determining unit 133 proceeds to step S55-5. When the variable k is not equal to the variable m (NO), the output information determining unit 133 proceeds to step S55-7.

In step S55-5, the output information determining unit 133 acquires the device operation information of the k-th registered object from the registered object list stored in the state storage unit 100.

In step S55-6, the output information determining unit 133 determines whether any of the pieces of device operation information of the k-th registered object satisfies the output condition of the n-th registered device. When any of the pieces of device operation information satisfies the output condition (YES), the output information determining unit 133 proceeds to step S55-10. When all of the pieces of device operation information do not satisfy the output condition (NO), the output information determining unit 133 proceeds to step S55-7.

In step S55-7, the output information determining unit 133 determines whether the variable k is equal to the number of pieces of data M. When the variable k is different from the number of pieces of data M (NO), the output information determining unit 133 proceeds to step 55-8. When the variable m is equal to the number of pieces of data M (YES), the output information determining unit 133 proceeds to step S55-9.

In step S55-8, the output information determining unit 133 increments the variable k. Then, the output information determining unit 133 returns to step S55-4.

In step S55-9, the output information determining unit 133 determines that the device operation information acquired in step S54 does not satisfy the output condition acquired in step S53, and ends the process.

In step S55-10, the output information determining unit 133 determines that the device operation information acquired in step S54 satisfies the output condition acquired in step S53, and ends the process.

FIG. 21 illustrates an example of the device output information in the present embodiment. The first example of the output condition of the device output information in the present embodiment is the output condition that does not require the device operation information of other registered objects. The second example of the output condition of the device output information in the present embodiment are the output conditions that require the device operation information of other registered objects.

As illustrated in FIG. 21, the first example of the output condition in the present embodiment is that there exists device operation information indicating that the m-th registered object (hereafter, also referred to as "person α") has performed an operation for which a fee is incurred at the electronic device (here, assumed to be an MFP), and the payment completed flag is 0 (=false), which indicates payment not completed.

As illustrated in FIG. 21, when it is determined that the first example of the output condition is satisfied, one or more of the following operation instructions is determined as the operation instruction to be transmitted to the registered device. The first operation instruction is to add the MFP usage fee to the billing amount to be presented to person α. The second operation instruction is to instruct the management apparatus 10 to update the payment completed flag in the device operation information of person α to 1 (=true), which indicates payment completed.

As illustrated in FIG. 21, the second example of the output condition in the present embodiment is that there exists device operation information indicating that the k-th registered object (hereinafter, (hereinafter, also referred to as "person β") has performed an operation for which a fee is incurred at the electronic device (here, assumed to be an MFP), and the payment completed flag is 0 (=false), which indicates payment not completed. Note that person β is assumed to have the same group ID as person α.

As illustrated in FIG. 21, when it is determined that the second example of the output condition is satisfied, one or more of the following operation instructions is determined as the operation instruction to be transmitted to the registered device. The first operation instruction is to add the MFP usage fee relating to person β to the billing amount to be presented to person α. The second operation instruction is to display an option indicating that "person not person α, will pay" and a "yes" or "no" selection button with respect to the MFP usage fee relating to person R. In this case, when "yes" is selected, the billing amount presented to person α is updated to an amount obtained by subtracting the MFP usage fee relating to person R. The third operation instruction is to instruct the management apparatus 10 to update the payment completed flag in the device operation information of person β, to 1 (=true), which indicates payment completed, when person α has paid the billing amount to which the MFP usage fee relating to person β has been added.

Referring back to FIG. 9, further explanations will be given. In step S6, the output information determining unit 133 provided in the management apparatus 10 sends the operation instruction information representing the operation instruction to the operation instructing unit 14. The operation instruction information includes information indicating the determined operation instruction.

The operation instructing unit 14 receives operation instruction information from the output information determining unit 133. Next, the operation instructing unit 14 transmits the operation instruction included in the operation instruction information to the settlement apparatus 40.

In the settlement apparatus 40, the fee settlement unit 41 receives the operation instruction from the management apparatus 10. Next, the fee settlement unit 41 executes the operation using the fee information included in the operation instruction according to the received operation instruction. For example, the fee settlement unit 41 displays the fee information included in the operation instruction on the display 506 in addition to the price of the articles purchased by the user.

For example, when the fee settlement unit 41 receives the fee information relating to all members of the group to which the user belongs, the fee to be settled by the user is displayed on the display 506 in a selectable format. When the user desires individual settlement, the user can make the settlement by excluding the fee based on the operation of the electronic device by another user.

Effect of Embodiment

The fee management system 1 in the present embodiment tracks the movement of a person based on an image capturing the vicinity of the electronic device 30, and transmits an operation instruction using information representing the fee incurred by the user's operation of the electronic device 30, to the settlement apparatus 40 which detects that the user is in the vicinity. Therefore, according to the fee management system 1 in the present embodiment, the fee information based on an operation can be transmitted to the settlement apparatus in the vicinity of the user who has operated the electronic device.

In particular, in the fee management system 1 in the present embodiment, a group to which multiple users belong is identified, and when it is detected that any user belonging to the group is in the vicinity of the settlement apparatus 40, the fee information of all users belonging to the group is transmitted to the settlement apparatus 40. This enables the user to settle the usage fees of all the users in the group in a lump sum.

Application Examples

In the above embodiment, the description focuses on an example in which the management target space is assumed to be a small store such as a convenience store, and the fee is settled with respect to the electronic device 30 that is an MFP. However, the usage scene to which the fee management system 1 can be applied is not limited thereto, and the fee management system 1 can be applied to various usage scenes.

For example, the fee management system 1 can be configured to manage the usage fees of electronic devices installed in hotels. Various electronic devices are installed in hotels. For example, lobbies are sometimes equipped with PCs to search for local information. Also, guest rooms are sometimes equipped with set-top boxes that can play television broadcasts and on-demand videos. By managing the fee information of fees incurred by these devices by the fee management system 1, it becomes possible for hotel guests to settle their fees in a lump sum when checking out, without having to settle their fees each time.

For example, the fee management system 1 can be configured to manage the usage fees of electronic devices installed at airports. For example, an airport may have a pay lounge. An MFP or a similar device may be installed in a pay lounge. By managing the fee information of fees incurred at these devices by the fee management system 1, it becomes possible for passengers to settle the fee in a lump sum when leaving the lounge without having to settle the fee each time.

[Supplement]

In each of the above embodiments, the management apparatus 10 is an example of an information processing apparatus. The fee management system 1 is an example of an information processing system. The monitoring device 20 is an example of an imaging apparatus. The state managing unit 13 is an example of a user identifier. The operation information receiving unit 12 is an example of a usage information receiver. The operation instructing unit 14 is an example of a usage information transmitter.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

Also, the apparatus group described in the examples is merely indicative of one of a plurality of computing environments for carrying out the embodiments disclosed herein. In one embodiment, the management apparatus 10 includes multiple computing devices, such as a server cluster. The multiple computing devices are configured to communicate with each other over any type of communication link, including a network, shared memory, etc., and perform the processing disclosed herein.

According to one embodiment of the present invention, it is possible to transmit usage information based on an operation by a user with respect to an electronic device, to a settlement apparatus in the vicinity of the user who has operated the electronic device.

The information processing apparatus, the information processing system, the fee management method, and the recording medium are not limited to the specific embodiments described in the detailed description, and variations and modifications may be made without departing from the scope of the present invention.

What is claimed is:

1. An information processing apparatus comprising:
a first image receiver configured to receive a first image captured by an imaging apparatus in which a user of an electronic device and the electronic device are captured, the imaging apparatus and the electronic device being communicable with the information processing apparatus via a network;
a first user identifier configured to identify a first user from the first image;
a usage information receiver configured to receive, from the electronic device, usage information based on an operation of the first user identified by the first user identifier;
a second image receiver configured to receive a second image captured by the imaging apparatus in which a settlement apparatus and a second user capable of using the settlement apparatus are captured, the settlement apparatus being communicable with the information processing apparatus via the network;
a second user identifier configured to identify the second user from the second image; and
a usage information transmitter configured to transmit the usage information to the settlement apparatus, based on the first user identified by the first user identifier and the second user identified by the second user identifier.

2. The information processing apparatus according to claim 1, wherein the usage information is a usage fee.

3. The information processing apparatus according to claim 1, wherein the usage information transmitter transmits the usage information to the settlement apparatus in response to detecting that the first user and the second user belong to a same group.

4. The information processing apparatus according to claim 1, wherein
the imaging apparatus is configured by a first camera and a second camera,
the first camera captures the first image, and
the second camera captures the second image.

5. An information processing system comprising:
the information processing apparatus according to claim 1;
the electronic device;
the settlement apparatus; and
the imaging apparatus, wherein
the electronic device, the settlement apparatus, the imaging apparatus, and the information processing apparatus are communicable with each other via the network.

6. A fee management method executed by a computer, the fee management method comprising:
receiving a first image captured by an imaging apparatus in which a user of an electronic device and the electronic device are captured, the imaging apparatus and the electronic device being communicable with the computer via a network;
identifying a first user from the first image;
receiving, from the electronic device, usage information based on an operation of the identified first user;
receiving a second image captured by the imaging apparatus in which a settlement apparatus and a second user capable of using the settlement apparatus are captured, the settlement apparatus being communicable with the computer via the network;

identifying the second user from the second image; and transmitting the usage information to the settlement apparatus, based on the identified first user and the identified second user.

7. A non-transitory computer-readable recording medium storing a program that causes a computer to execute a process, the process comprising:

receiving a first image captured by an imaging apparatus in which a user of an electronic device and the electronic device are captured, the imaging apparatus and the electronic device being communicable with the computer via a network;

identifying a first user from the first image;

receiving, from the electronic device, usage information based on an operation of the identified first user;

receiving a second image captured by the imaging apparatus in which a settlement apparatus and a second user capable of using the settlement apparatus are captured, the settlement apparatus being communicable with the computer via the network;

identifying the second user from the second image; and transmitting the usage information to the settlement apparatus, based on the identified first user and the identified second user.

* * * * *